(12) United States Patent
Leung et al.

(10) Patent No.: US 11,332,235 B2
(45) Date of Patent: May 17, 2022

(54) ACTIVE FLOW CONTROL SYSTEMS FOR AIRCRAFT AND RELATED METHODS

(71) Applicant: The Boeing Company, Chicago, IL (US)

(72) Inventors: Andrew Leung, Philadelphia, PA (US); Michael J. Duffy, Lansing, NY (US); Mary E. Beckman, West Chester, PA (US); John Jeffrey Mattero, Media, PA (US); Rene Woszidlo, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 16/036,516

(22) Filed: Jul. 16, 2018

(65) Prior Publication Data

US 2020/0017199 A1 Jan. 16, 2020

(51) Int. Cl.
*B64C 21/04* (2006.01)
*F15D 1/00* (2006.01)

(52) U.S. Cl.
CPC ............. *B64C 21/04* (2013.01); *F15D 1/002* (2013.01); *B64C 2230/04* (2013.01)

(58) Field of Classification Search
CPC .......... B64C 21/00–08; B64C 2230/00; B64C 2230/04; B64C 2230/06; B64C 21/04; B64C 2230/18; B64C 2230/14; B64C 23/00; F15D 1/002; F15D 1/12; F15D 1/008; Y02T 50/10
See application file for complete search history.

(56) References Cited

U.S. PATENT DOCUMENTS

| | | | | |
|---|---|---|---|---|
| 3,889,903 A | * | 6/1975 | Hilby | ..................... B64C 21/04 244/207 |
| 3,920,203 A | * | 11/1975 | Moorehead | ............. B64C 21/04 244/207 |
| 4,099,691 A | * | 7/1978 | Swanson | ................. B64C 21/04 244/134 B |

(Continued)

OTHER PUBLICATIONS

Airplanedriver.net, "Lockheed F-104 Starfighter," last retrieved from [http://www.airplanedriver.net/study/f104.htm], on Jul. 16, 2018, 16 pages.

(Continued)

*Primary Examiner* — Medhat Badawi
(74) *Attorney, Agent, or Firm* — Hanley, Flight & Zimmerman, LLC

(57) ABSTRACT

Active fluid control systems and related methods are disclosed. A disclosed example active fluid control system includes a plurality of plenums coupled together to define a fluid flow passageway, and a plurality of fluidic actuators coupled to outer surfaces of respective ones of the plenums. The fluidic actuators define actuator inlets and actuator outlets. The fluid flow passageway defined by the plenums to fluidly couple the fluidic actuators and a pressurized fluid supply source. The plenums are configured to couple to an aircraft structure supporting an aerodynamic surface to enable the actuator outlets to be mounted to the aerodynamic surface. The fluidic actuators are configured to provide the pressurized fluid to the aerodynamic surface to modify an aerodynamic characteristic of the aerodynamic surface.

20 Claims, 18 Drawing Sheets

(56) References Cited

U.S. PATENT DOCUMENTS

| | | | | |
|---|---|---|---|---|
| 5,363,704 | A * | 11/1994 | Huang | G01F 1/3227 |
| | | | | 137/826 |
| 5,368,258 | A * | 11/1994 | Johnson | B64C 21/06 |
| | | | | 244/130 |
| 7,128,082 | B1 * | 10/2006 | Cerretelli | B05B 1/08 |
| | | | | 137/14 |
| 8,382,043 | B1 * | 2/2013 | Raghu | B64C 21/04 |
| | | | | 244/1 N |
| 8,690,106 | B1 * | 4/2014 | Reissig | B64C 21/025 |
| | | | | 244/208 |
| 9,089,856 | B2 * | 7/2015 | Gopalan | B05B 1/08 |
| 10,005,544 | B2 * | 6/2018 | Shmilovich | B64C 9/16 |
| 10,526,072 | B2 * | 1/2020 | Shmilovich | B64C 23/065 |
| 2017/0081020 | A1 * | 3/2017 | Pujar | B64D 33/02 |
| 2017/0349268 | A1 | 12/2017 | Duffy et al. | |

OTHER PUBLICATIONS

Dowgwillo, "A Stake in the Ground: How Boundary Layer Control Was Implemented on a Production Tactical Aircraft," AIAA SciTech Forum, Jan. 8-12, 2018, last retrieved from [http://arc.aiaa.org] on Jul. 16, 2018, 14 pages.

* cited by examiner

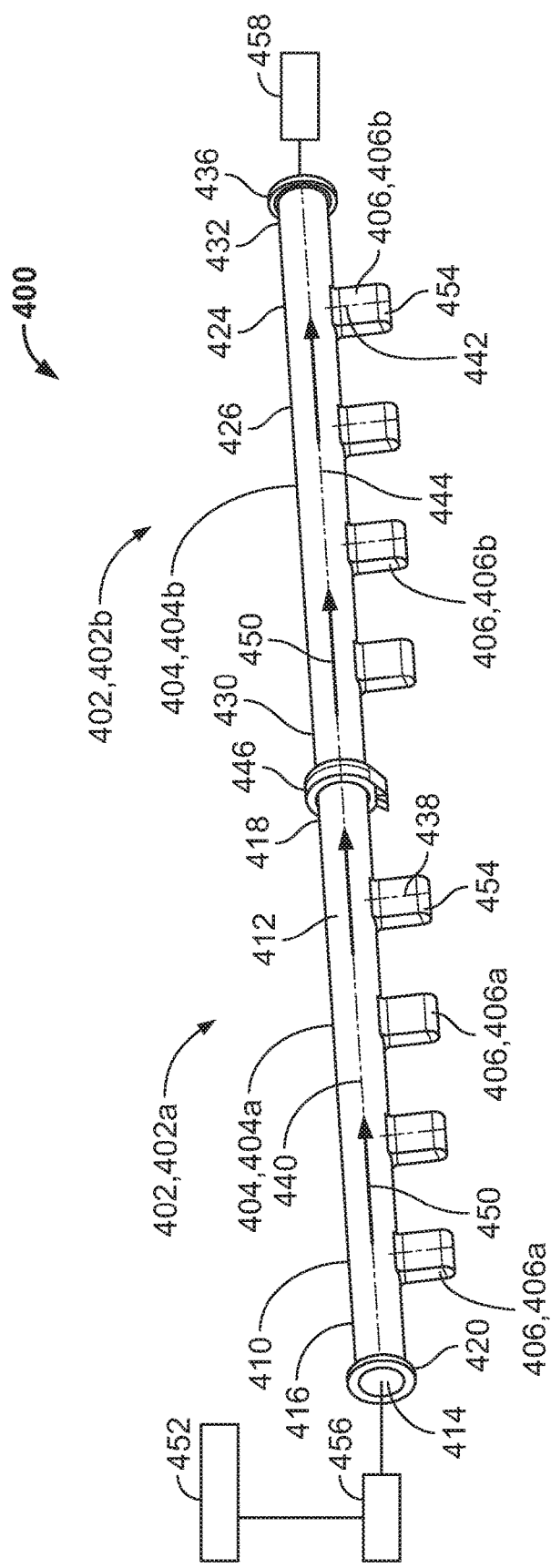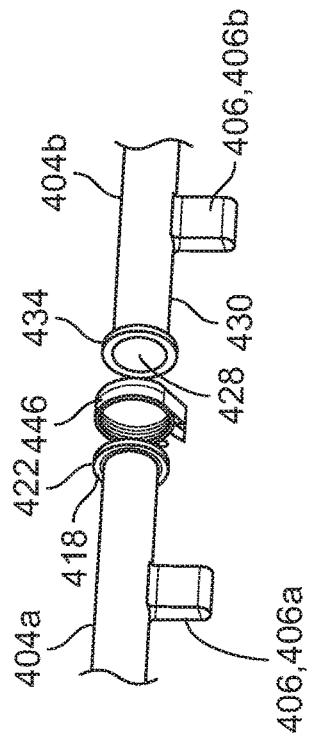

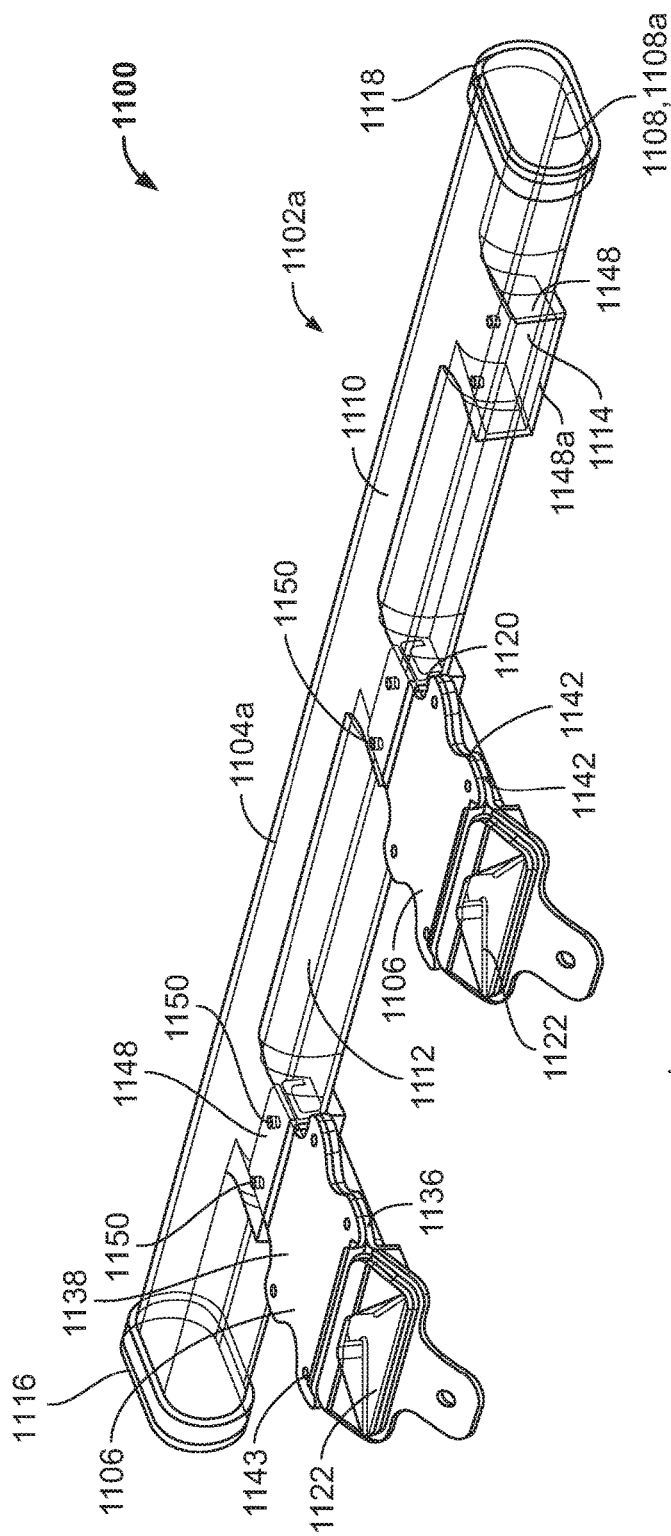
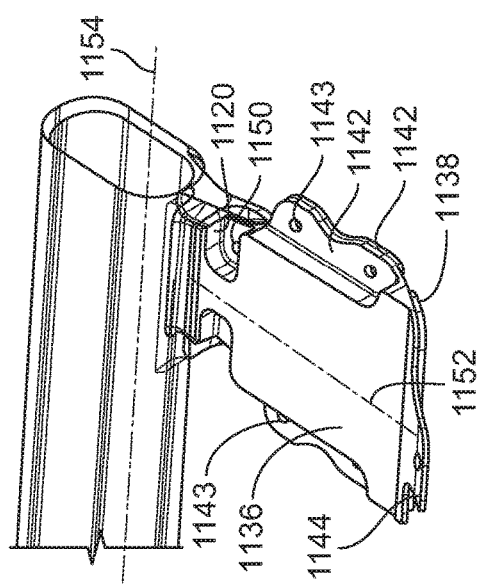
FIG. 11A
FIG. 11B

ACTIVE FLOW CONTROL SYSTEMS FOR AIRCRAFT AND RELATED METHODS

FIELD OF THE DISCLOSURE

This disclosure relates generally to aircraft and, more particularly, to active flow control systems for aircraft and related methods.

BACKGROUND

Aerodynamic forces and moments that act on the aircraft can affect performance characteristics of an aircraft. For example, the manner in which air flows over a top surface and/or a bottom surface of a wing of an aircraft affects lift performance characteristics. To improve aircraft performance, some aircraft employ active flow control systems to affect aerodynamic forces and moments that act on aerodynamic surfaces of the aircraft. However, some such known systems add significant weight to the aircraft, thereby increasing overall weight of the aircraft and reducing fuel efficiency.

BRIEF DESCRIPTION OF THE DRAWINGS

FIGS. 4A-4D illustrate another example active flow control system disclosed herein.

FIGS. 11A-11C illustrate yet another example active flow control system disclosed herein.

Figure 1:
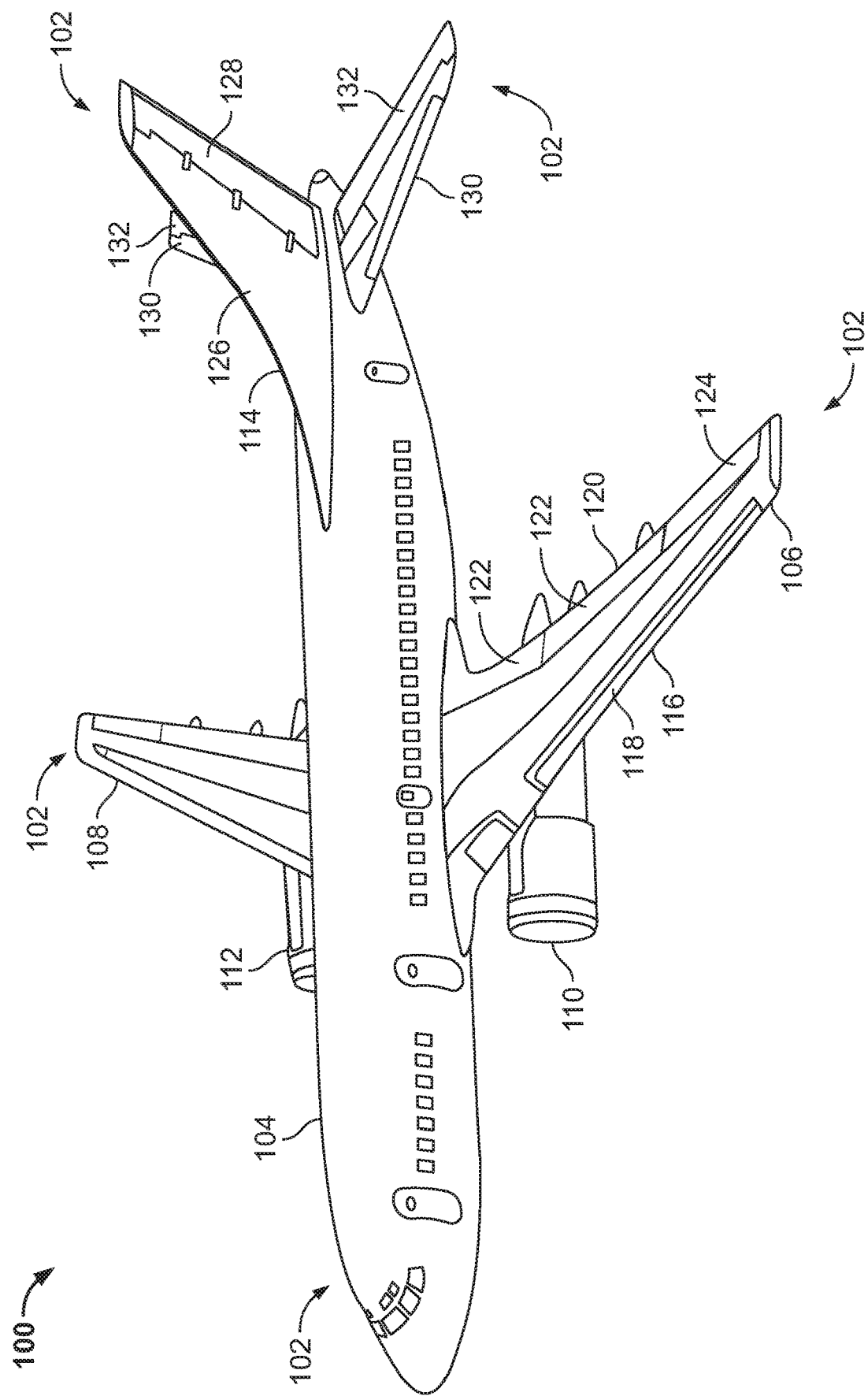
FIG. 1 illustrates an example aircraft in which example active flow control systems disclosed herein can be implemented.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples. In other words, the example disclosed herein are not mutually exclusive to each other. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. For example, the term "at least one of A, B and C" refers any combination or subset of A, B, C such as (1) A alone, (2) B alone, (3) C alone, (4) A with B, (5) A with C, (6) B with C, and (7) A with B and with C.

Some known aircraft employ fluidic actuators to affect an aerodynamic characteristic(s) of an aerodynamic surface. However, integration of fluidic actuators onto a vehicle platform can be difficult and complex because known fluidic actuators typically depend on a specific physical geometry as well as fluidic interface (e.g., inlet pressure and fluid flow) to function properly. For example, such known fluidic actuators such as fluidic oscillators employ a complex shaped fluidic channel and/or complex shaped inlets and outlets (e.g., square or rectangular shaped openings) to achieve a desired pressure and flow needed to affect the aerodynamic characteristic(s). Such complex or non-conventional geometry of the fluidic actuators tends to be difficult to integrate with known fluid delivery systems. For example, conventional connectors or couplings (e.g., tubing or cylindrically shaped couplers) cannot be integrated with such complex shaped fluidic actuators. Thus, integration of fluidic actuators into a vehicle platform is often complex, costly, inefficient, and time consuming.

In some examples, known active flow control systems employ fluidic actuators fluidly coupled to a fluid supply source via individual hoses. However, fluidly coupling the fluid supply source to each fluidic actuator via hoses requires significant space and/or add significant weight to a vehicle (e.g., an aircraft), thereby reducing performance characteristic(s). Additionally, a connection between a hose and a fluidic actuator typically employs a connector (e.g., a quick connect end connector) that can cause a large pressure change (e.g., a large drop in pressure) across the connector as fluid flows through the connector. In some instances, known connectors increase potential sealing issues, reducing the overall system efficiency. Additionally, due to the geometry of the fluidic actuator, integrating the quick connect end onto the fluidic actuator can be complex and costly.

Some example active flow control systems employ fluidic actuators with a single plenum machined into a large billet of raw material. In production environments, such machined systems cause installation challenges (e.g., due to the size of the machined plenum when multiple actuators are required). However, such known machined systems can have poor sealing, weight, and/or repairability characteristics. The machined system would also need to be specifically designed for the platform and offers no flexibility, such as number of actuators or spacing of actuators.

Example methods and apparatus disclosed herein provide modular fluid flow control systems. Example distribution systems disclosed herein provide fluidic actuator distribution systems that optimize delivery of a fluid to an array of fluidic actuators that inject pressurized airflow into an airflow. Example distribution systems disclosed herein simplify integration onto a platform such as, for example, an aircraft and/or reduce (e.g., minimize) pressure drop and flow loss by simplifying the source fluid connection to the fluidic actuators via plenums.

Additionally, example distribution systems disclosed herein provide modularity to enable configuration of fluid delivery systems for different applications without requiring significant redesign or customization of components (e.g., the plenum or segments). For example, delivery systems disclosed herein combine one or more actuators with a plenum (e.g., a segment) that can be joined with additional plenum segments that include fluidic actuators. For example, a first segment or assembly (e.g., a first plenum and at least one fluidic actuator) can be coupled (e.g., joined) with a second segment or assembly (e.g., a second plenum and at least one fluidic actuator) to define a fluid distribution system. Such example fluid flow control systems disclosed herein enable customization of a fluidic actuator distribution system (e.g., as it allows for adjustments to actuator quantity, plenum length, etc.) without the need to redesign the distribution system. For example, plenum segments having a plurality of actuators can be pre-fabricated to have different numbers of fluidic actuators and/or plenum lengths. To this end, the pre-fabricated segments can be selected and fluidly coupled (e.g., combined) to form a custom fluid distribution system.

Additionally, example active flow control systems disclosed herein enable retrofitting existing structures or vehicles such as, for example, aircrafts. In such examples, aircrafts include existing structure that can restrict installation of known active flow control systems (e.g., the known machined plenum systems described above). Unlike known active flow control systems, the example active flow control systems disclosed herein include a plurality of plenums that can be coupled around and/or through existing structure of the aircraft. For example, the plenums of the illustrated examples can be installed separately through existing access panels and be passed through bulkheads, ribs, and/or frame portions of an aircraft (e.g., an aircraft wing). Additionally, the plenums can be fluidly coupled via a coupling or connector such as, for example, a flexible duct, a T-shaped coupling, or transitional coupling, an elbow (e.g., a 90-degree elbow), and/or any other suitable connector(s) or coupler(s). Additionally, example plenums disclosed herein can include one or more fluidic actuators (e.g., fluidic oscillators). Specifically, the fluidic actuators are attached to outer surfaces of the plenums and are fluidly coupled to flow paths of the plenums via openings or slots formed in the outer surfaces of the plenums. Example fluidic actuators disclosed herein include complex geometrical shapes and/or flow paths. For example, example fluidic actuators disclosed herein can have square shaped inlets, rectangular shaped inlets, oblong inlets, etc. Such complex geometrically shaped fluidic inlets increase integration complexities between the fluidic actuators and the plenums. Examples disclosed herein enable integration of fluidic actuators having complex actuator inlets (e.g., non-circular shaped inlets) with example plenums disclosed herein. Example fluidic actuators disclosed herein can be fastened, welded, bonded, clamped and/or otherwise attached to outer surfaces of example plenums disclosed herein. The active flow control systems disclosed herein allow flexibility in system design as segments (e.g., plenums with different quantities of actuators).

Example active flow control systems disclosed herein affect airflow over one or more surfaces of aircraft structures to improve aircraft performance. For example, active flow control systems disclosed herein provide active flow control to affect a boundary layer of one or more of the aircraft structures by adding energy to the boundary layer, prevent flow separation at a surface of the aircraft structure(s), redirect airflow, control circulation of airflow, change a pressure redistribution, and/or otherwise affect airflow across one or more surfaces of the aircraft structures. For example, to affect airflow over one or more surfaces of the aircraft structures, the active flow control systems disclosed herein inject pressurized airflow in an airflow across the one or more surfaces of the aircraft structures. Affecting airflow across surfaces of the aircraft structures can reduce drag, increase lift, improve fuel efficiency, reduce download forces, increase aircraft speed, reduce noise, and/or improve other performance characteristic(s) of the aircraft 100. Example surfaces of aircraft structures in which the active flow control systems disclosed herein can be employed are disclosed in U.S. patent application Ser. No. 15/169,879, which is incorporated herein by reference in its entirety.

FIG. 1 illustrates an aircraft 100 in which example active flow control systems disclosed herein can be implemented. The aircraft 100 of the illustrated example includes aircraft structures 102 including a fuselage 104, wings 106, 108, engines 110, 112 supported by the respective wings 106, 108, and a tail section 114. Each of the wings 106, 108 includes a leading edge 116 including slats 118 and a trailing edge 120 including flaps 122 and ailerons 124. The tail section 114 of the illustrated example includes a vertical stabilizer 126, a rudder 128, horizontal stabilizers 130, and elevators 132. The active flow control systems disclosed herein provide airflow control (e.g., affect a boundary layer) of one or more of the fuselage 104, the wings 106, 108, the leading edge 116, the trailing edge 120, the slats 118, the flaps 122, the ailerons 124, the tail section 114, vertical stabilizer 126, the rudder 128, the horizontal stabilizers 130 and/or the elevators 132. For example, to improve performance in changing yaw in flight, example active fluid control systems disclosed herein can be mounted to or supported by the vertical stabilizer 126 to provide active airflow control around the rudder 128. In some examples, the active flow control systems disclosed herein can be implemented with the horizontal stabilizers 130 to provide active flow control to the elevators 132. In some examples, to control a size of a boundary layer (e.g., to improve or control lift and/or reduce drag), the active flow control systems disclosed herein can be implemented with or supported by the wings 106, 108 to provide active airflow control around the wings 106, 108, the ailerons 124, the flaps 122 and/or the slats 118.

The example active flow control systems disclosed herein are not limited to the aircraft 100 of FIG. 1. For example, the active flow control systems disclosed herein can be implemented with other types of aircraft. For example, active flow control systems disclosed herein can be implemented with vertical takeoff and landing aircraft, military aircraft, helicopters, and/or any other type of aircraft. Additionally, the example active flow control systems disclosed herein can be implemented with other types of vehicles including, but not limited to, a ship, a submarine, a vehicle (e.g., a racecar, a train, an automobile, a bus, etc.) and/or any other vehicle or aerodynamic surfaces. In some examples, the active flow control systems disclosed herein can aid in different phases of flight. For example, when implemented with vertical takeoff and landing aircraft, active flow control systems disclosed herein can reduce download on wings of VTOL vehicles due to positioning of rotor engines (e.g., tilted rotor engines) of the VTOL during takeoff.

Figure 2A:
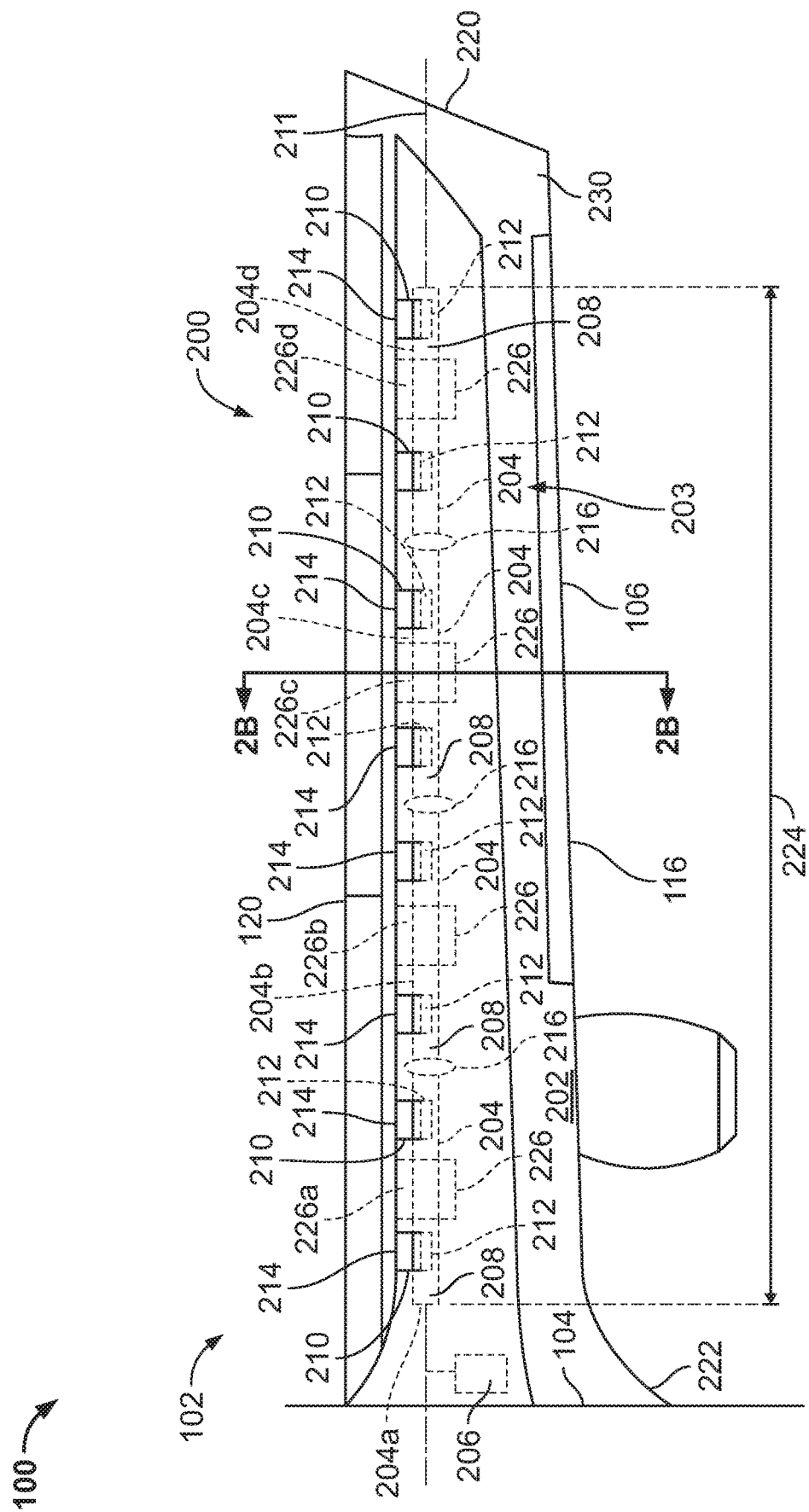
FIG. 2A is a plan view of an aerodynamic surface of the example aircraft implemented with an example active flow control system disclosed herein.
Figure 2B:
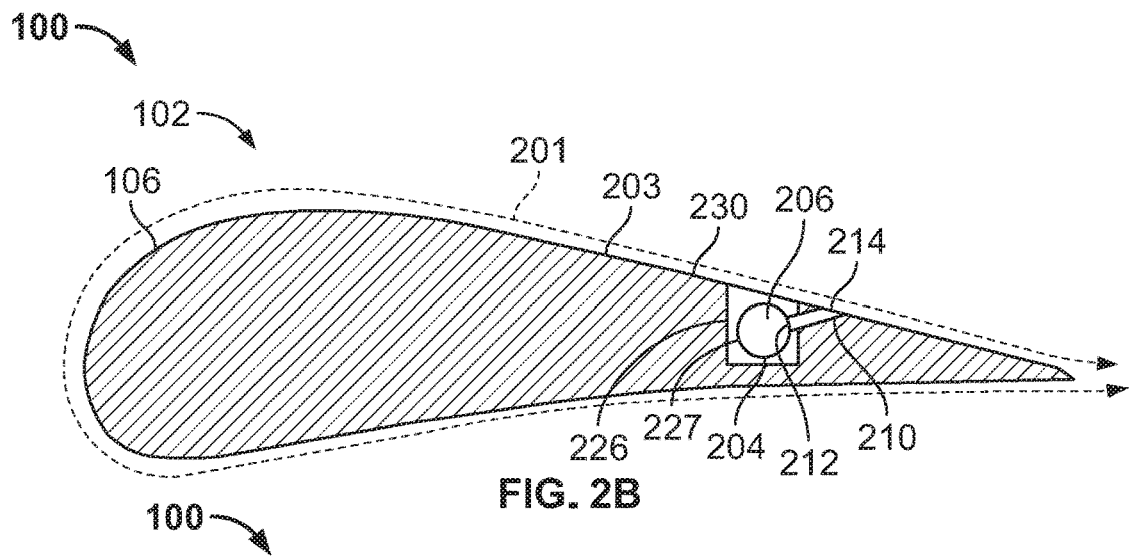
FIG. 2B is a cross-sectional view of the example aerodynamic surface taken along line 2B-2B of FIG. 2A.

FIG. 2A is a plan view of the wing 106 of the aircraft 100 of FIG. 1 implemented with an active flow control system 200 disclosed herein. FIG. 2B is a cross-sectional view of the wing 106 of FIG. 2A taken along line 2B-2B. Referring to FIGS. 2A and 2B, the active flow control system 200 of the illustrated example is supported by (e.g., positioned inside) the wing 106 and injects pressurized fluid into an airflow or boundary layer 201 of an aerodynamic surface 203 (e.g., an airfoil) during flight to increase aircraft performance characteristic(s). The active flow control system 200 of the illustrated example provides airflow control towards the trailing edge 120 of the wing 106. However, in some examples, the active flow control system 200 can be positioned to provide airflow control towards the leading edge 116 of the wing 106. Additionally, the active flow control system 200 of the illustrated example provides airflow control on an aerodynamic surface 203 (e.g., an upper surface 202) of the wing 106. However in some examples, the active flow control system 200 provides airflow control on a lower surface of the wing 106 opposite the upper surface 202.

The active flow control system 200 of the illustrated example includes a plurality of plenums 204 coupled in fluid communication to a fluid supply source 206 (e.g., a single or common fluid supply source). Each of the plenums 204 of the illustrated example defines a passageway 208 and includes a plurality of fluidic actuators 210 (e.g., fluidic oscillators, non-steady state flow devices). The fluidic actuators 210 of the illustrated example are spaced along a longitudinal axis 211 of the plenums 204. The fluidic actuators 210 of the illustrated example have actuator inlets 212 and actuator outlets 214. The fluidic actuators 210 of the illustrated example are coupled (e.g., mounted or attached) to the plenums 204 such that the actuator inlets 212 are in fluid communication with the passageway 208 of the respective one of the plenums 204. The fluidic actuators 210 define an airflow path that is substantially perpendicular to an airflow path of the passageways 208. As used herein, the term "substantially" means approximately rather than perfectly. Thus, the airflow path of the fluidic actuators 210 (e.g., between the actuator inlets 212 and the actuator outlets 214) can be approximately perpendicular (e.g., within 5% tolerance) relative to the airflow path of the passageways 208 or perfectly perpendicular relative to the passageway 208. The actuator outlets 214 of the fluidic actuators 210 are mounted adjacent the upper surface 202 of the wing 106. In operation, the fluidic actuators 210 receive pressurized fluid from the fluid supply source 206 via the plenums 204 and inject the pressurized fluid into an airflow stream along the upper surface 202 (e.g., the aerodynamic surface 203 of the wing 106) to affect the boundary layer 201 of the wing 106 during flight.

The plenums 204 of the illustrated example provide a modular fluid distribution system that defines a fluid flow path between the fluid supply source 206 and the actuator outlets 214 of the fluidic actuators 210. Specifically, the plenums 204 of the illustrated example are coupled together via connectors 216. In some examples, respective ends of adjacent plenums 204 are directly coupled (e.g., joined) via the connectors 216. The connectors 216 can include, for example, flanges formed at respective ends of the plenums 204, flexible couplers, friction-fit connection between respective ends of the plenums 204, adhesive (e.g., bonding agents), elbows (e.g., 90 degree elbows), and/or any other connectors. In this manner, the plenums 204 are coupled in series (e.g., daisy-chained) and receive pressurized fluid (e.g., air, liquid, water, gas, etc.) from the fluid supply source 206. Further, a number of plenums 204 can be coupled together to vary an overall length 224 of the active flow control system 200 between a first end 220 (e.g., wing tip) of the wing 106 and a second end 222 of the wing 106 adjacent the fuselage 104. For example, the active flow control system 200 of the illustrated example includes a first plenum 204$a$, a second plenum 204$b$, a third plenum 204$c$ and a fourth plenum 204$d$ coupled in fluid communication via the connectors 216. Thus, an overall length 224 of the active flow control system 200 can be varied during, for example, installation of the active flow control system 200 with the wing 106. In some examples, the aircraft 100 of the illustrated example can be retrofit with the active flow control system 200. Additionally, the fluidic actuators 210 receive the pressurized fluid from the fluid supply source 206 via the plenums 204 and, thus, the active flow control system 200 disclosed herein does not require coupling each of the fluidic actuators 210 to the fluid supply source 206 via hoses. In the illustrated example, the plenums 204 are identical (e.g., each of the plenums 204 has the same length and the same number of fluidic actuators 210). In some examples, the plenums 204 can have different lengths and/or different numbers of fluidic actuators 210. In some examples, the active flow control system 200 can have more than four plenums 204 or less than four plenums 204. In some examples, one or more of the plenums 204 can have only one fluidic actuator 210. In some examples, one or more of the plenums 204 do not include the fluidic actuators 210. In some such examples, the one or more plenums 204 formed without fluidic actuators 210 can be used to define a flow path.

The active flow control system 200 of the illustrated example is supported by an aircraft frame or support structure 226 that supports or forms the wing 106. In some examples, the plenums 204 of the illustrated example are coupled or routed around and/or through the support structure 226 of the aircraft 100. For example, at least a portion of the plenums 204 of the illustrated example pass through and/or are routed around one or more ribs, frames and/or other structure(s) forming the wing 106 and/or supporting a skin 230 of the wing 106. To enable the plenums 204 to pass through the support structures 226, the openings 227 (FIG. 2B) can be formed through the respective ones of the support structures 226 to receive respective ones of the plenums 204. Each of the plenums 204 is configured to couple to the support structure 226 supporting the aerodynamic surface 203 to enable the actuator outlets 214 to be positioned toward the aerodynamic surface 203. For example, the first plenum 204a is supported by a first support structure 226a, the second plenum 204b is supported by a second support structure 226b, the third plenum 204c is supported by a third support structure 226c, and the fourth plenum 204d is supported by a fourth support structure 226d. In some examples, the actuator outlets 214 of the fluidic actuators 210 are positioned adjacent or mounted to the skin 230 (e.g., the upper surface 202) of the aircraft 100.

Figure 3A:
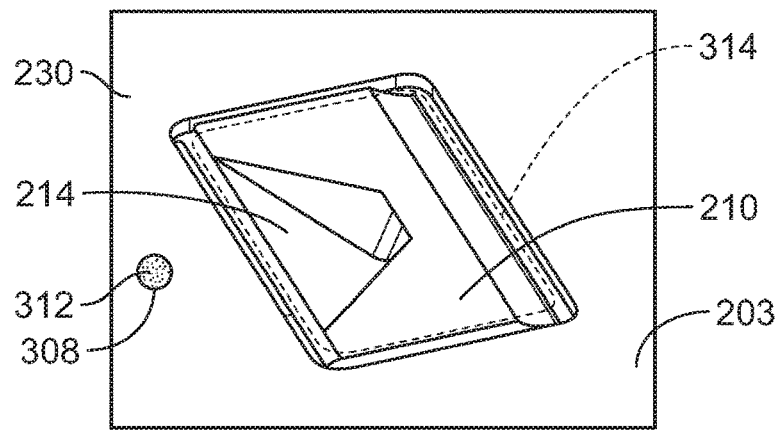
FIG. 3A is a perspective, partial view of the example aerodynamic surface of FIGS. 2A and 2B.
Figure 3B:
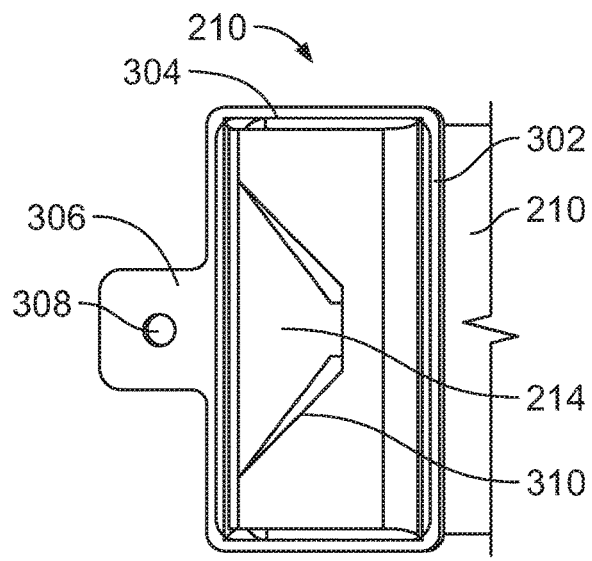
FIG. 3B is a perspective, partial view of the example aerodynamic surface of FIGS. 2A and 2B, but shown without an example skin.

FIG. 3A is partial, perspective view of the wing 106 of the aircraft 100 of FIGS. 1, 2A and 2B. FIG. 3B is a partial, perspective view of the wing of FIG. 3A, but shown without the skin 230. The actuator outlets 214 of the illustrated example are coupled adjacent the aerodynamic surface 203 of the aircraft 100. For example, the actuator outlet 214 of the illustrated example includes a flange 302 that defines a perimeter 304 of the actuator outlet 214. The actuator outlet 214 of the illustrated example has a rectangular cross-sectional shape. However, in some examples, the actuator outlet 214 includes a trapezoidal cross-sectional shape and/or any other cross-sectional shape. Additionally, the actuator outlet 214 of the illustrated example is recessed relative to the upper surface 202 of the aerodynamic surface 203 (e.g., the wing 106). In some examples, the actuator outlet 214 of the illustrated example is flush mounted relative to the aerodynamic surface 203 (e.g., the wing 106). In this manner, a body or portion of the actuator outlet 214 does not project into an airflow stream of the aerodynamic surface 203.

To mount the actuator outlet 214 to the aerodynamic surface 203, the actuator outlet 214 of the illustrated example includes a mounting tab 306. The mounting tab 306 of the illustrated example is integrally formed with the flange 302 defining the perimeter 304 of the actuator outlet 214. To couple the mounting tab 306 to the aerodynamic surface 203, the mounting tab 306 of the illustrated example includes an aperture 308. The mounting tab 306 of the illustrated example protrudes from the flange 302 such that the aperture 308 is spaced from an opening 310 of the actuator outlet 214. The fluidic actuator 210 of the illustrated is mounted to the aerodynamic surface 203 via a fastener 312 (e.g., a countersunk fastener) such that the fastener 312 does not protrude or project into the airflow stream of the aerodynamic surface 203. However, in other examples, the fluidic actuator 210 can be coupled to the aerodynamic surface 203 via chemical fasteners (e.g., epoxy, glue, etc.). Additionally, a sealant 314 (e.g., an adhesive, a gasket, etc.) seals the perimeter 304 of the actuator outlet 214 relative to the upper surface 202 (e.g., the skin 230).

The plenums 204 and/or the fluidic actuators 210 can be formed from metallic material(s) (e.g., aluminum, stainless steel), alloy(s), plastic material(s) ((e.g., Polyvinyl chloride, a thermoplastic material, a thermoset material (e.g., High density Polyethylene), etc.) and/or a combination thereof and/or any other suitable material(s). In some examples, the plenum 204 and/or the fluidic actuators 210 can be formed as a unitary piece or structure. In some examples, the fluidic actuators 210 can be formed as unitary piece or structure that can be coupled to the plenums 204. In some examples, the fluidic actuators 210 can be formed as separate portions and assembled together prior to coupling to the plenums 204. In some examples, the fluidic actuators 210 are welded (e.g., plastically welded or metallically welded) to the plenums 204. In some examples, the fluidic actuators 210 are fastened to the plenums 204 via fasteners (e.g., screws, rivets, etc.), chemical fasteners (e.g., epoxy, bonding agent, adhesive, etc.), snap-fit connection, interference fits, and/or any other fastener(s) or fastening technique(s).

In some examples, the plenums 204 and/or the fluidic actuators 210 disclosed herein can be manufactured or formed via an additive manufacturing process (e.g., 3D printing), injection molding, machining, and/or any other suitable manufacturing process, and/or any combination thereof. Example additive manufacturing process(es) include, but are not limited to, direct metal laser sintering (DMLS), laser freeform manufacturing technology (LFMT), selective laser melting (SLM), fused deposition modeling (FDM), laser puddle deposition (LPD), small puddle deposition (SPD), laser powder bed (LPB), electron beam powder bed (EBPD), indirect power bed (IPD), laser deposition technology (LDT), laser repair technology (LRT), laser cladding technology (LCT), laser deposition welding (LDW), laser deposition welding with integrated milling (LDWM), selective laser sintering (SLS), direct metal printing (DMP), and/or stereolithography (SLA) and/or any combination.

FIG. 4 illustrates another example active flow control system 400 disclosed herein. The active flow control system 400 of the illustrated example includes a plurality of segments 402 that are coupled together to form a fluid distribution system. Each of the segments 402 of the illustrated example includes a plenum 404 having a plurality of fluidic actuators 406 (e.g., fluidic oscillators). For example, a first segment 402a of the active flow control system 400 of the illustrated example includes a first plenum 404a and a plurality of first fluidic actuators 406a, and the second segment 402b includes a second plenum 404b having a plurality of second fluidic actuators 406b. The first segment 402a of the illustrated example is substantially similar or identical to a second segment 402b. In some examples, the first segment 402a can be different from the second segment 402b. For example, the first segment 402a can include more or fewer fluidic actuators 406 than the second segment 402b. In some examples, the first segment 402a can have a length that is different than a length of the second segment 402b.

The first plenum 404a of the illustrated example includes a first body 410 (e.g., a cylindrical body) defining an outer surface 412 and a first passageway 414 between a first end 416 of the first body 410 and a second end 418 of the first body 410 opposite the first end 416. The first plenum 404a of the illustrated example is a cylindrical tube that has a circular cross-sectional shape. Additionally, the first body 410 of the illustrated example includes a first flange 420 formed at the first end 416 of the first body 410 and a second flange 422 formed at the second end 418 of the first body 410.

The second plenum 404b of the illustrated example is identical to the first plenum 404a. For example, the second plenum 404b of the illustrated example includes a second body 424 defining an outer surface 426 and a second passageway 428 (FIG. 4B) between a first end 430 of the second body 424 and a second end 432 of the second body 424 opposite the first end 430. The second plenum 404b of the illustrated example is a cylindrical tube that has a circular cross-sectional shape. The second body 424 of the illustrated example includes a first flange 434 formed at the first end 430 of the second body 424 and a second flange 436 formed at the second end 432 of the second body 424.

Figure 4C:
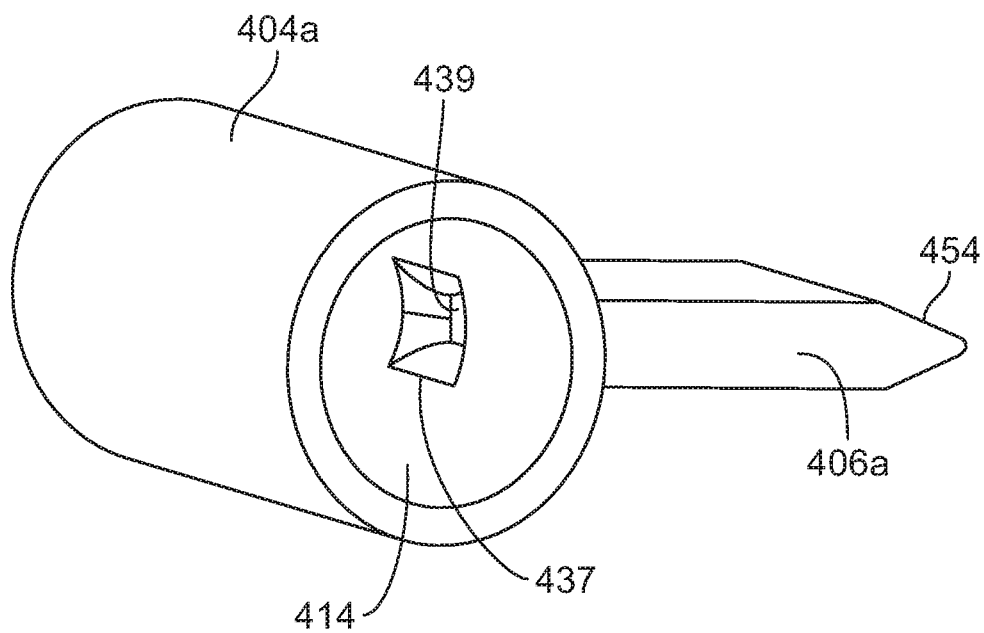
Figure 4D:
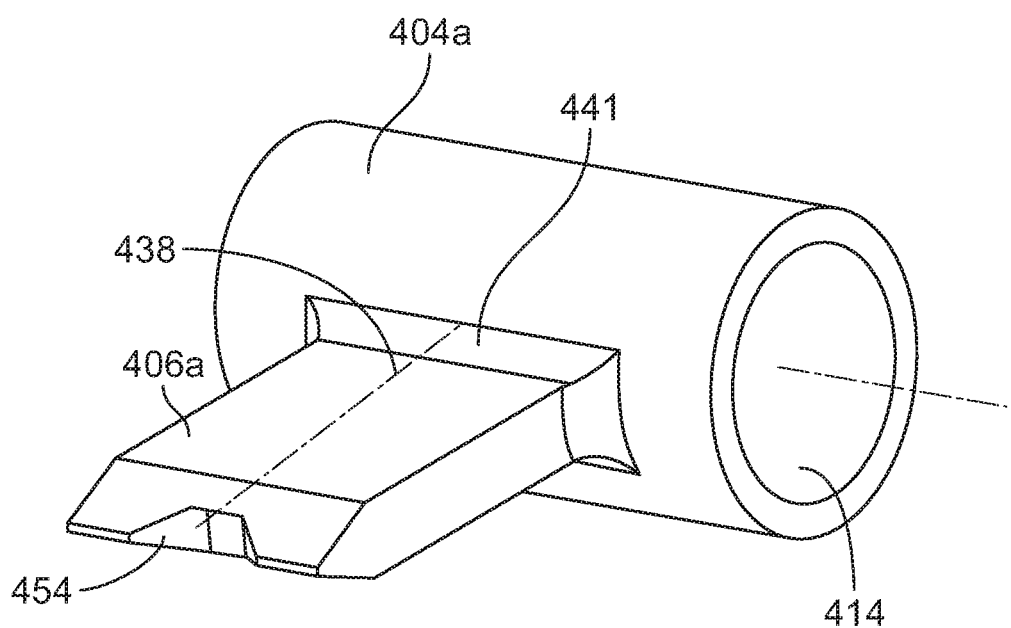

The first fluidic actuators 406a of the illustrated example are coupled (e.g., attached) to the outer surface 412 of the first plenum 404a. The first plenum 404a of the illustrated example includes a plurality of slots or openings to fluidly couple the first fluidic actuators 406a and the first passageway 414. For example, FIG. 4C illustrates a slot 437 formed through the outer surface 412 of the first plenum 404a to fluidly couple an actuator inlet 439 of a fluidic actuator 406 to the first passageway 414. The slots 437 of the illustrated example have a rectangular shape. However, in some examples, the slots 437 can have a circular shape, a square shape, a trapezoidal shape, and/or any other shape(s). Additionally, the actuator inlet 439 of the illustrated example has a rectangular shape (e.g., a rectangular shaped cross-section). However, in some examples, the actuator inlet 439 can have a circular shape, a square shape, a trapezoidal shape, and/or any other shape(s). In the illustrated example, the slot 437 has a shape complementary to the shape of the actuator inlet 439. However, in some examples, the slot 437 can have a shape (e.g., a square shape or circular shape) that is different than a shape (e.g., a rectangular shape) of the actuator inlet 439. The fluidic actuators 406 of the illustrated example are welded to the respective outer surfaces 412, 426 of the first and second plenums 404a, 404b. For example, referring to FIG. 4D, each of the fluidic actuators 406 is coupled to the outer surface 412 via a weld 441. The weld 441 of the illustrated example surrounds (e.g., seals) the slot 437 to prevent pressurized fluid from escaping through the outer surface 412 via the slot 437.

Each of the first fluidic actuators 406a of the illustrated example has a longitudinal axis 438 that is non-parallel (e.g., substantially perpendicular) relative to a longitudinal axis 440 of the first passageway 414 of the first plenum 404a. Likewise, the second fluidic actuators 406b of the illustrated example are coupled (e.g., attached) to the outer surface 426 of the second plenum 404b. Each of the second fluidic actuators 406b of the illustrated example has a longitudinal axis 442 that is non-parallel (e.g., substantially perpendicular) relative to a longitudinal axis 444 of the second passageway 428 of the second plenum 404b.

To couple the first plenum 404a and the second plenum 404b, the active flow control system 400 of the illustrated example includes a connector 446. The connector 446 of the illustrated example is a clamp (FIG. 4B). The connector 446 of the illustrated example couples to the second flange 422 of the first body 410 and the first flange 434 of the second body 424. In some examples, the second flange 422 of the first plenum 404a and the first flange 434 of the second plenum 404b can be coupled via a plurality of fasteners. In some examples, a gasket or other seal (e.g., a ring-shaped gasket, O-ring, etc.) can be positioned between the second flange 422 and the first flange 434 to seal an interface between the first plenum 404a and the second plenum 404b. In some examples, an elbow (e.g., a ninety-degree elbow) can be interposed between the first plenum 404a and the second plenum 404b.

When the first plenum 404a is coupled to the second plenum 404b, the first passageway 414 of the first plenum 404a and the second passageway 428 of the second plenum 404b define a fluid flow path 450 of the active flow control system 400. Specifically, to provide pressurized fluid to the first fluidic actuators 406a and the second fluidic actuators 406b via the fluid flow path 450, the active flow control system 400 of the illustrated example employs a fluid supply source 452. The fluid supply source 452 of the illustrated example is fluidly coupled to the first fluidic actuators 406a and the second fluidic actuators 406b via the fluid flow path 450. In operation, the first and second fluidic actuators 406a, 406b discharge the pressurized fluid via actuator outlets 454 along an aerodynamic surface (e.g., the wing 106 of FIGS. 1, 2A and 2B) of a vehicle (e.g., the aircraft 100) to modify an aerodynamic characteristic of an aerodynamic surface.

The active flow control system 400 of the illustrated example employs a first one-way valve 456 and a second one-way valve 458. The first one-way valve 456 of the illustrated example is coupled (e.g., fluidly coupled, directly coupled, etc.) to the first end 416 of the first plenum 404a. Specifically, the first one-way valve 456 is coupled between the fluid supply source 452 and the first plenum 404a. In some examples, the first one-way valve 456 can be coupled to the second plenum 404b. The first one-way valve 456 of the illustrated example is configured to allow pressurized fluid from the fluid supply source 452 to flow to the fluid flow path 450 defined by the first and second plenums 404a, 404b. When the fluid supply source 452 does not provide the pressurized fluid to the active flow control system 400, the first one-way valve 456 is to prevent back flow of fluid (e.g., and debris) from the fluid flow path 450 towards the fluid supply source 452

The second one-way valve 458 of the illustrated example is to close the fluid flow path 450 and/or prevent the pressurized fluid from exiting the fluid flow path 450 (e.g., via the first passageway 414 of the first plenum 404a and the second passageway 428 of the second plenum 404b instead of the fluidic actuators 406) when the fluid supply source 452 provides pressurized fluid to (e.g., the fluidic actuators 406 of) the active flow control system 400. When the fluid supply source 452 does not provide the pressurized fluid to the active flow control system 400 (e.g., the fluid flow path 450), the second one-way valve 458 is to allow fluid flow to drain from the fluid flow path 450. The second one-way valve 458 of the illustrated example is coupled to the second plenum 404b. However, the second one-way valve 458 is to couple to the fluid flow path 450 and/or the active flow control system 400 at a point of lowest elevation (e.g., to facilitate drainage). In some examples, the outer surface 412 of the first plenum 404a and/or the outer surface 426 of the second plenum 404b can include one or more drains to drain the respective first and second passageways 414, 428 of the fluid flow path 450.

Figure 5A:
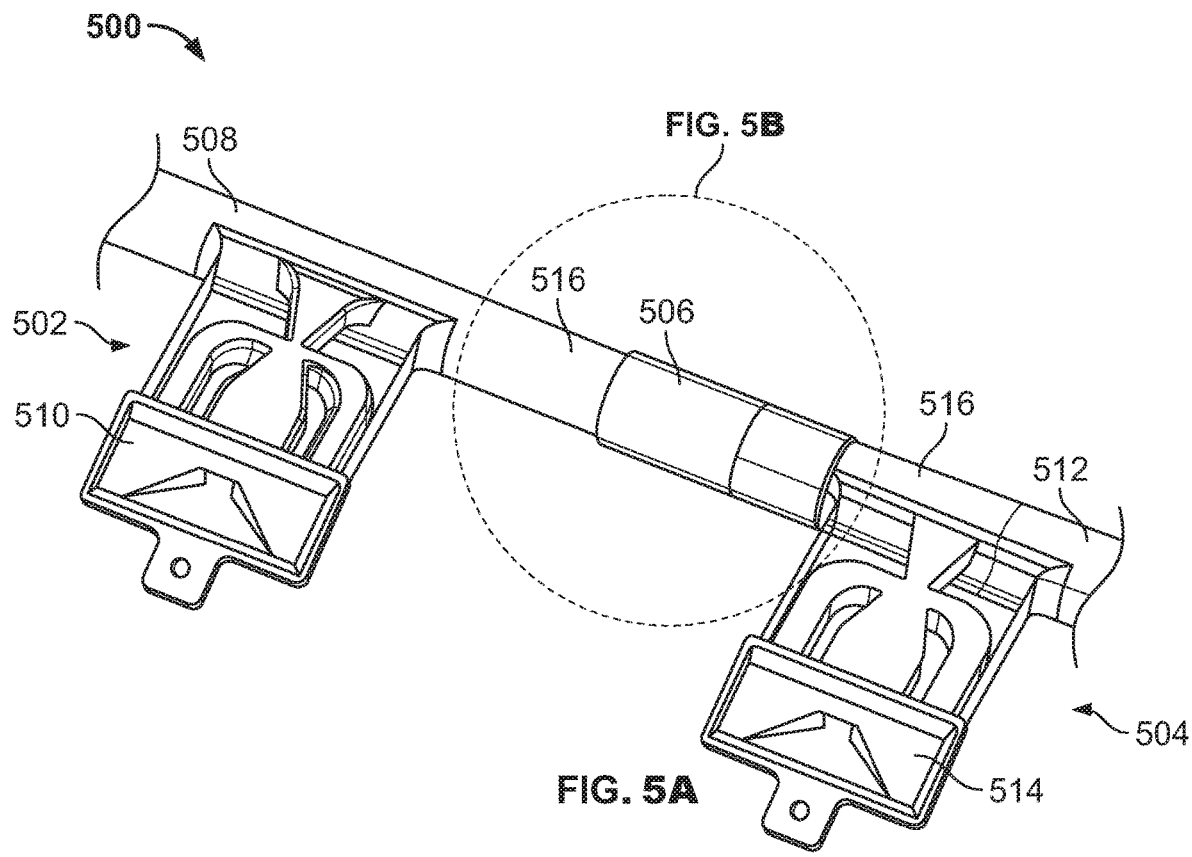
FIGS. 5A-5B illustrate another example active flow control system disclosed herein.
Figure 5B:
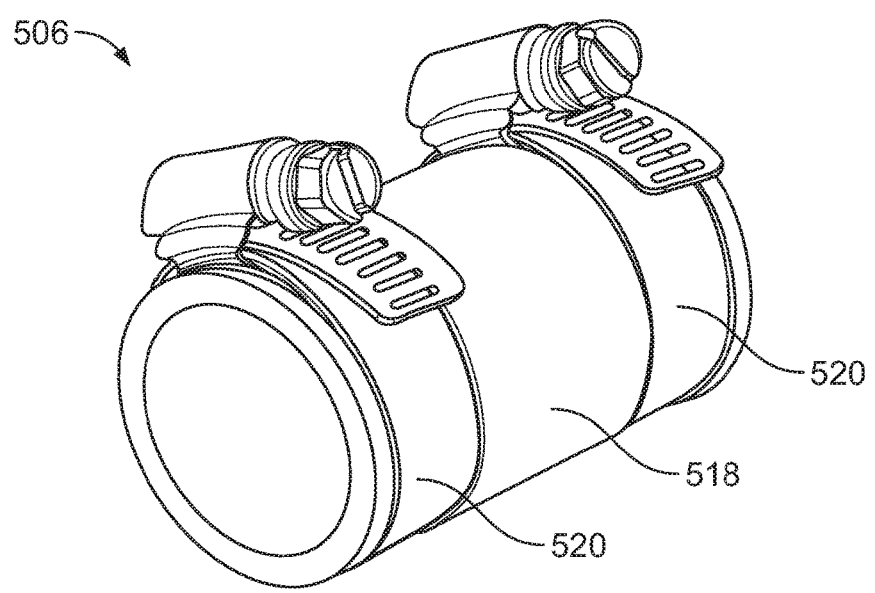

FIGS. 5A and 5B illustrates another example active flow control system 500 disclosed herein. The active flow control system of the illustrated example includes a first segment 502 coupled to a second segment 504 via a connector 506. The first segment 502 of the illustrated example includes a first plenum 508 and a first fluidic actuator 510 and the second segment 504 of the illustrated example includes a second plenum 512 and a second fluidic actuator 514. The first plenum 508 and the second plenum 512 of the illustrated example are substantially similar to the first plenum 404a and the second plenum 404b of the active flow control system 400 of FIGS. 4A-4D. However, the connector 506 of the illustrated example is different than the connector 446 of FIGS. 4A-4D. For example, respective ends 516 of the first and second plenums 508, 512 do not include flanges. To couple the first and second plenums 508, 512, the connector 506 of the illustrated example includes a flexible connector 518. The flexible connector 518 of the illustrated example is a rubber coupling that receives the ends 516 of the first and second plenums 508, 512. The flexible connector 518 of the illustrated example includes clamps 520 to secure the flexible connector 518 to the ends 516 of the first and second plenums 508, 512.

Figure 6:
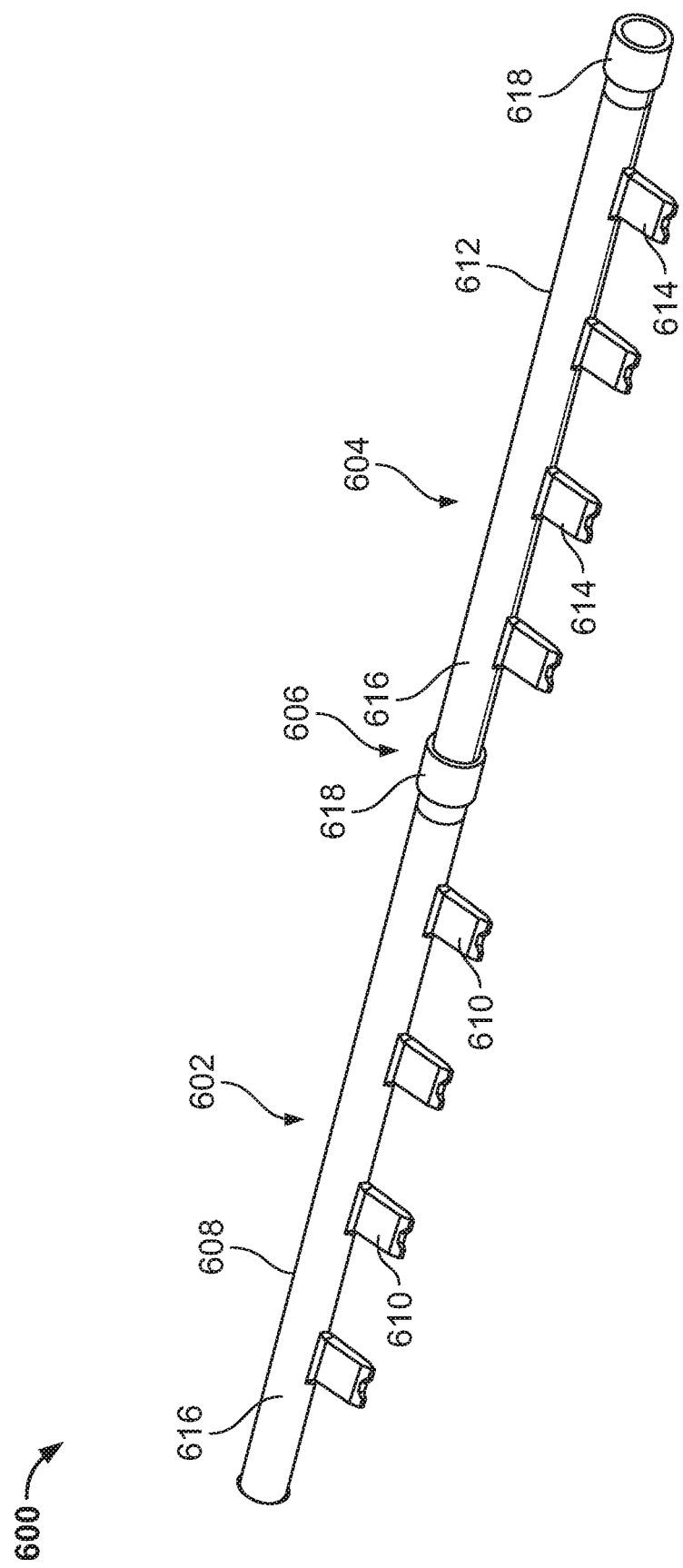
FIG. 6 illustrates another example active flow control system.

FIG. 6 illustrates another example active fluid control system 600 disclosed herein. The example active fluid control system 600 disclosed herein includes a first segment 602 coupled to a second segment 604 via a connector 606. The first segment 602 of the illustrated example and the second segment 604 are substantially similar to the first and second segments 402a, 402b of the FIGS. 4A-4D. For example, the first segment 602 of the illustrated example includes a first plenum 608 and a plurality of first fluidic actuators 610 and the second segment 604 includes a second plenum 612 and a plurality of second fluidic actuators 614. However, the connector 606 of the illustrated example is different form the connector 446 of FIGS. 4A-4D and the connector 506 of FIGS. 5A and 5B. To provide the connector 606, each of the first plenum 608 and the second plenum 612 has a first end 616 different than a second end 618. For example, the first ends 616 (e.g., a male connector) of the respective first and second plenums 608, 612 are smaller (e.g., have smaller diameters) than the second ends 618 (e.g., a female connector) of the first and second plenums 608, 612. To this end, the second end 618 of the first plenum 608 receives the first end 616 of the second plenum 612 to couple the first plenum 608 and the second plenum 612 via a male-to-female connection. In some examples, a bonding agent or adhesive can be used to couple the first end 616 of the second plenum 612 and the second end 618 of the first plenum 608.

Figure 7A:
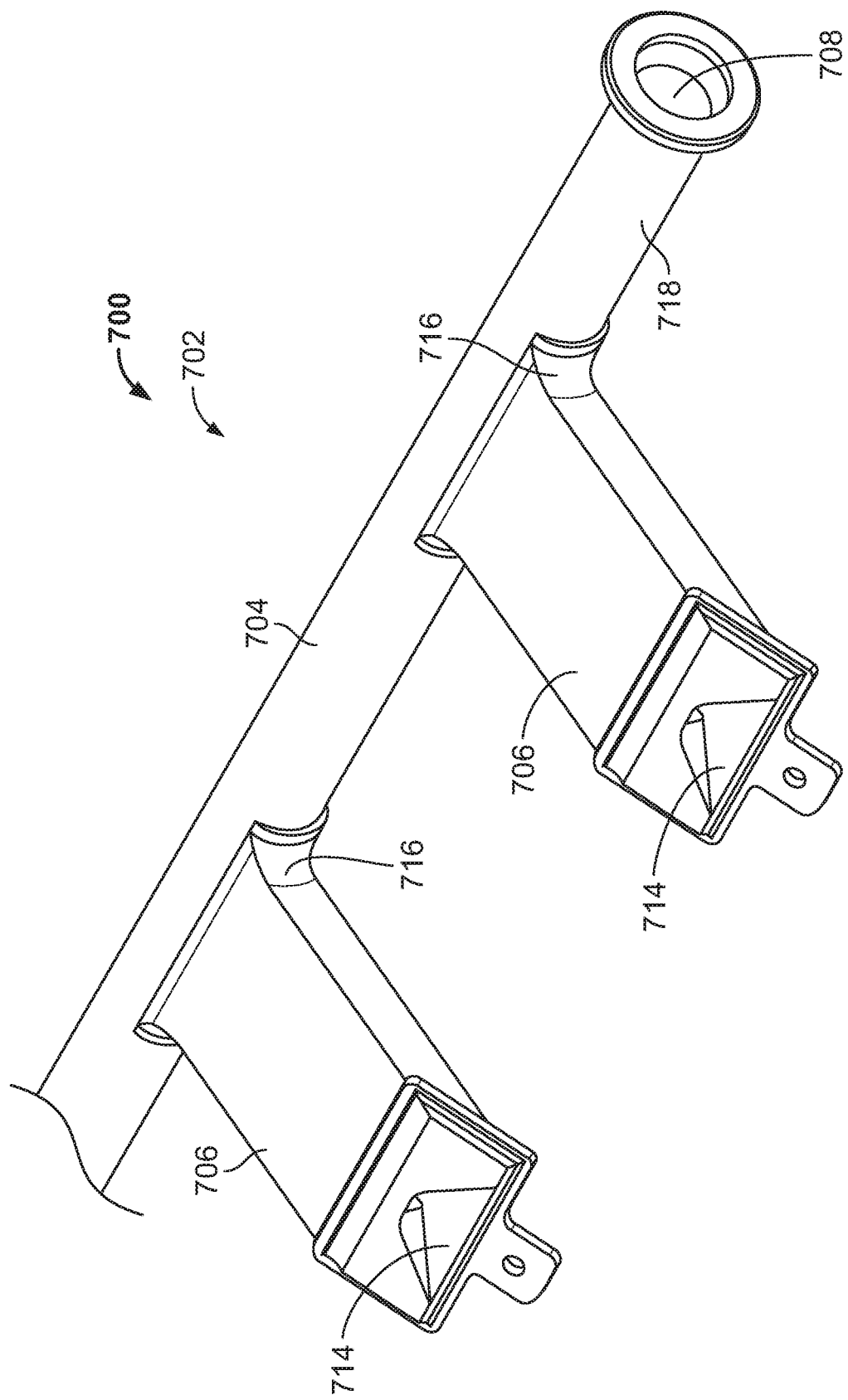
FIG. 7A illustrates yet another example active flow control system disclosed herein.
Figure 7B:
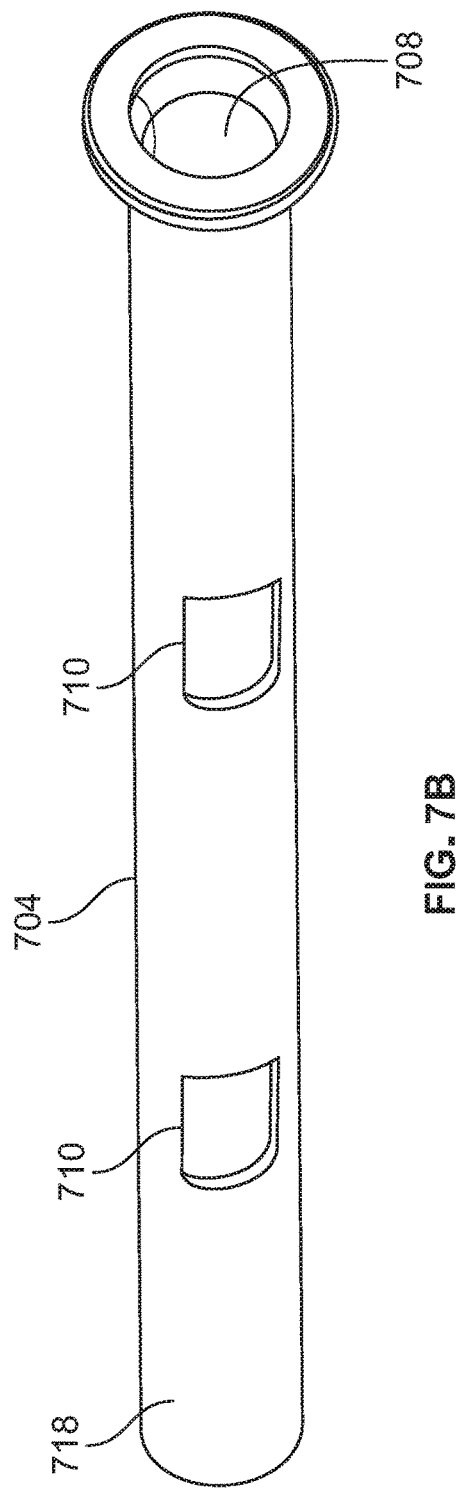
FIG. 7B is a perspective view of an example plenum of the example active flow control system of FIG. 7A.
Figure 7C:
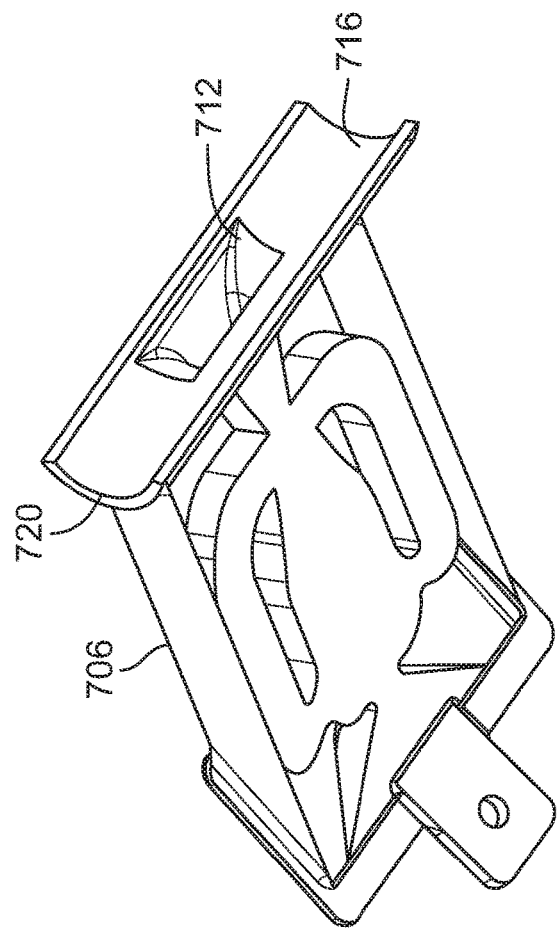
FIG. 7C is a perspective view of an example fluidic actuator of the example active flow control system of FIG. 7A.

FIGS. 7A-7B illustrate another example active flow control system 700 disclosed herein. Referring to FIGS. 7A-7C, the active flow control system 700 of the illustrated example includes a segment 702 including a plenum 704 and a plurality of fluidic actuators 706. The plenum 704 of the illustrated example defines a passageway 708 and a plurality of slots 710 formed through an outer surface 718 of the plenum 704 to fluidly couple the passageway 708 and the fluidic actuators 706. The slots 710 of the illustrated example are spaced along a longitudinal axis of the plenum 704.

Each of the fluidic actuators 706 of the illustrated example includes an actuator inlet 712 and an actuator outlet 714. Specifically, respective ones of the slots 710 fluidly couple to respective ones of the actuator inlets 712. The actuator inlets 712 and the slots 710 of the illustrated example have rectangular shapes.

The actuator inlets 712 of the fluidic actuators 706 of the illustrated example includes a flange 716 to facilitate attachment of the fluidic actuators 706 to the outer surface 718 of the plenum 704. Specifically, the flanges 716 of the illustrated example includes an arcuate profile 720 (e.g., a curved profile) that is substantially similar or identical to an arcuate profile of the outer surface 718. In other words, a radius of curvature of the arcuate profile 720 is substantially similar or identical to a radius of curvature of the outer surface 718.

When coupled to the outer surface 718, respective ones of the actuator inlets 712 of the fluidic actuators 706 are fluidly coupled to the passageway 708 of the plenum 704 via respective ones of the slots 710 formed through the outer surface 718 of the plenum 704. To couple or mount the fluidic actuators 706 to the outer surface 718, the fluidic actuators 706 of the illustrated example are coupled to the outer surface 718 via welding. Further, the flanges 716 of the fluidic actuators 706 have a size (e.g., perimeter) that is larger than a size (e.g., a perimeter) of the slots 710 of the plenum 704. In this manner, respective ones of the flanges 716 encircle or encompass the respective ones of the slots 710 when the fluidic actuators 706 are coupled to the plenum 704. Additionally, the flange 716 matably engages the outer surface 718 when the fluidic actuators 706 are coupled to the outer surface 718. In this manner, the flanges 716, when welded to the outer surface 718 of the plenum 704, provide a seal to prevent pressurized fluid in the passageway 708 from escaping through the outer surface 718 of the plenum 704 instead of the actuator outlets 714.

Each of the fluidic actuators 706 of the illustrated example is formed as a unitary piece or structure. For example, the fluidic actuators 706 can be formed via additive manufacturing, injection molding, casting, and/or any other manufacturing process(es). The segment 702 (e.g., the plenum 704 and the fluidic actuators 706) can be formed from metallic material(s) (e.g., aluminum, tungsten, etc.), a plastic material(s) (e.g., High density Polyethylene) and/or any other material(s). Additionally, the fluidic actuators 706 can be coupled to the plenum 704 via metallic welding, plastic welding, and/or any other fastener(s).

Figure 8A:
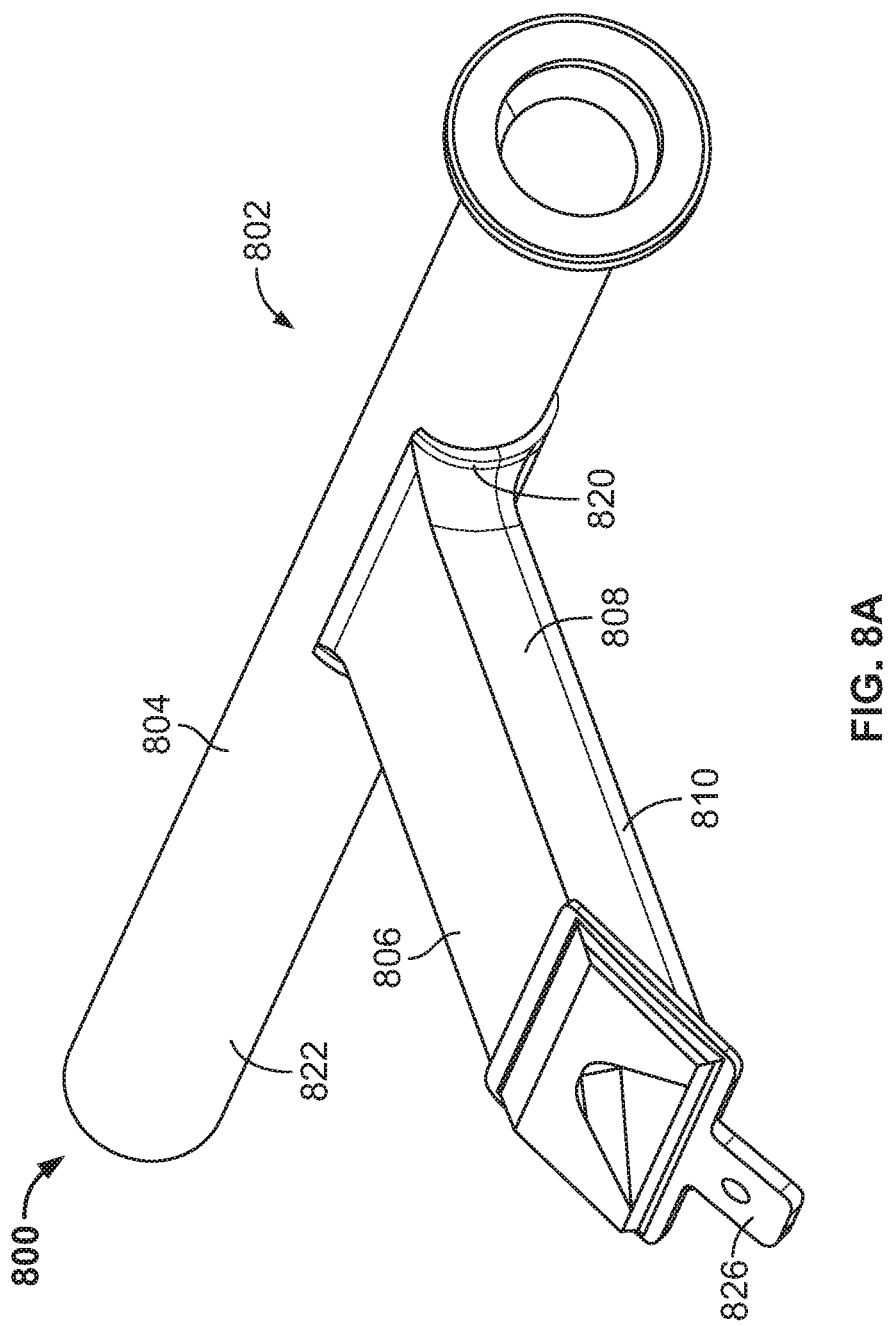
FIG. 8A illustrates yet another example active flow control system disclosed herein.
Figure 8B:
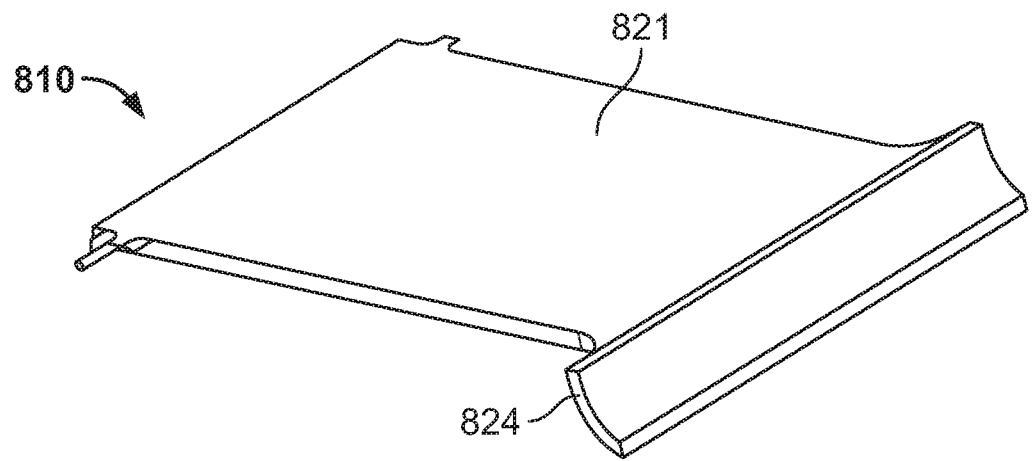
FIG. 8B is a perspective view of an example first portion of an example fluidic actuator of the example active flow control system of FIG. 8A.
Figure 8C:
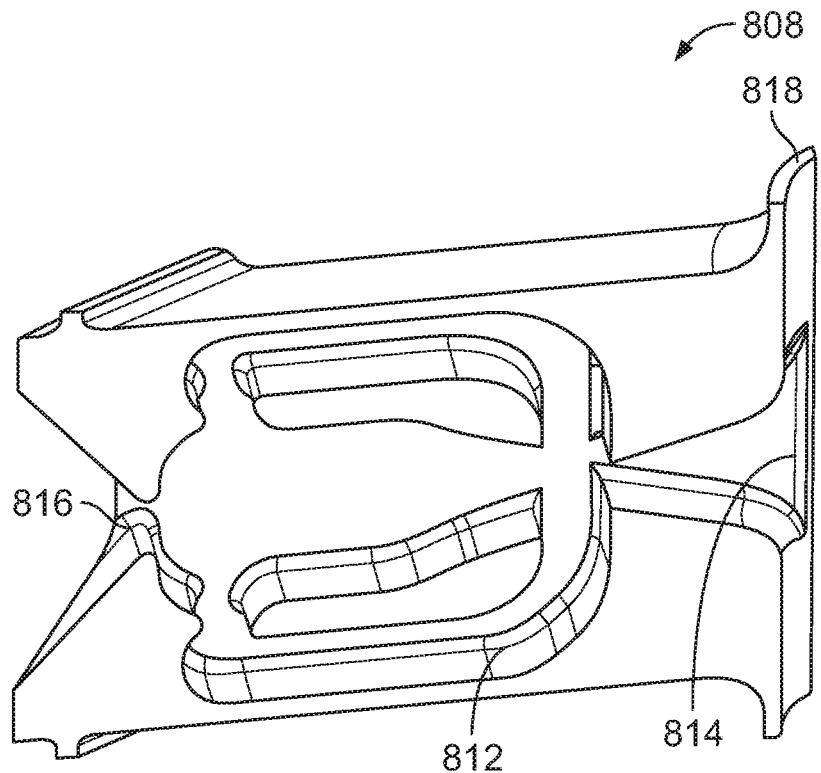
FIG. 8C is a perspective view of an example second portion of the example fluidic actuator of the example active flow control system of FIG. 8A.

FIGS. 8A-8C illustrate another example active flow control system 800 disclosed herein. The active flow control system 800 of the illustrated example is substantially similar to the active flow control system 700 of FIGS. 7A-7C. For example, the active flow control system 800 of the illustrated example includes a segment 802 having a plenum 804 and a fluidic actuator 806. Unlike the fluidic actuators 706 of FIGS. 7A-7C, the fluidic actuator 806 of the illustrated example is a multi-piece, fluidic actuator. Specifically, the fluidic actuator 806 of the illustrated example includes a first portion 808 (e.g., an upper portion) and a second portion 810 (e.g., a lower portion or base).

The first portion 808 of the illustrated example defines a fluidic channel 812 between an actuator inlet 814 and an actuator outlet 816. Additionally, the first portion 808 defines a first part 818 (e.g., a first half) of a flange 820 of the fluidic actuator 806 that facilitates mounting of the fluidic actuator 806 to an outer surface 822 of the plenum 804. The second portion 810 of the illustrated example defines a base 821 that encloses or seals the fluidic channel 812 between the actuator inlet 814 and the actuator outlet 816. The base 821 of the illustrated example defines a second part 824 (e.g., a second half) of the flange 820. When the first part 818 is coupled to the second part 824 to from the flange 820, the flange 820 has an arcuate profile complementary to an arcuate profile of the outer surface 822 so that the flange 820 matably engages the outer surface 822. In some examples, a gasket or seal can be provided between the flange 820 and the outer surface 822. Additionally, the base 821 of the illustrated example defines a mounting tab 826.

The first portion 808 and/or the second portion 810 of the fluidic actuator 806 of the illustrated example can be formed via machining, injection molding, additive manufacturing, and/or any combination thereof and/or any other manufacturing process(es). After formation of the first and second portions 808, 810, the first portion 808 of the illustrated example is coupled to the second portion 810 via welding, chemical bonding, adhesive and/or another suitable fastener(s).

Figure 9A:
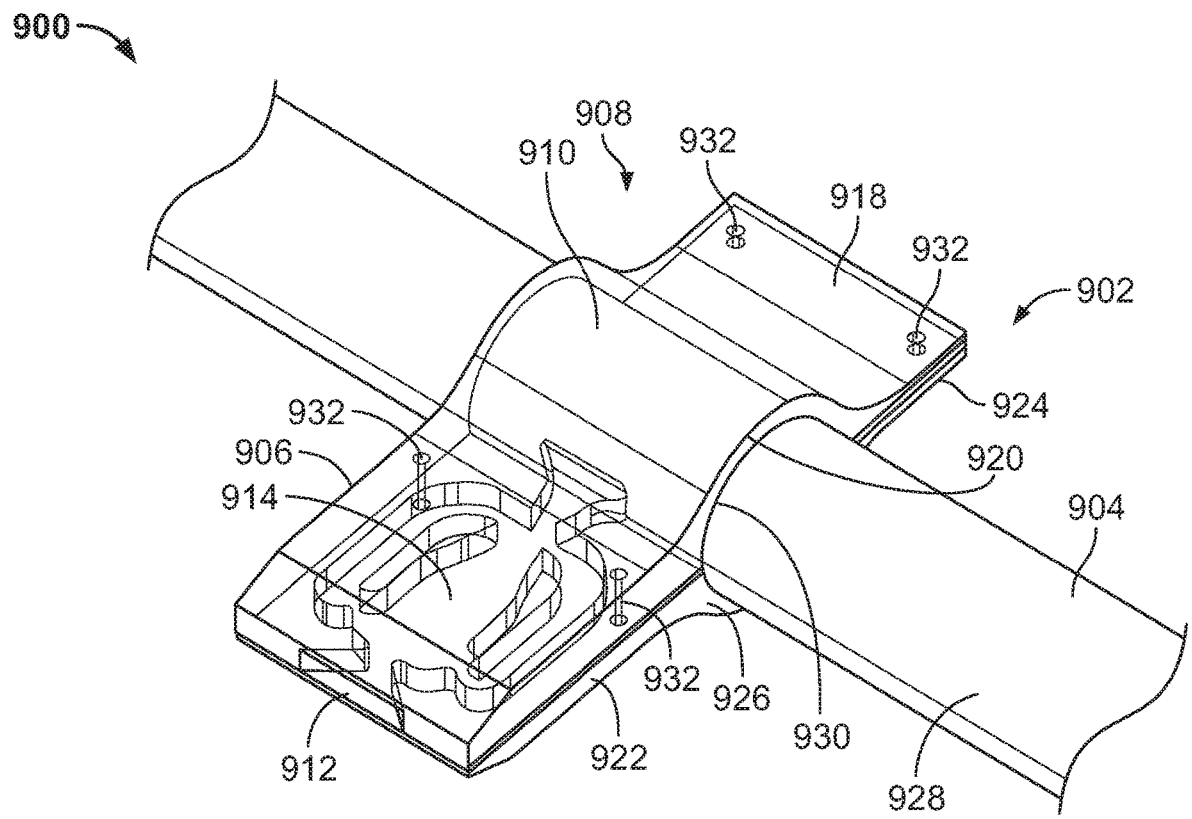
FIGS. 9A-9B illustrate yet another example active flow control system disclosed herein.
Figure 9B:
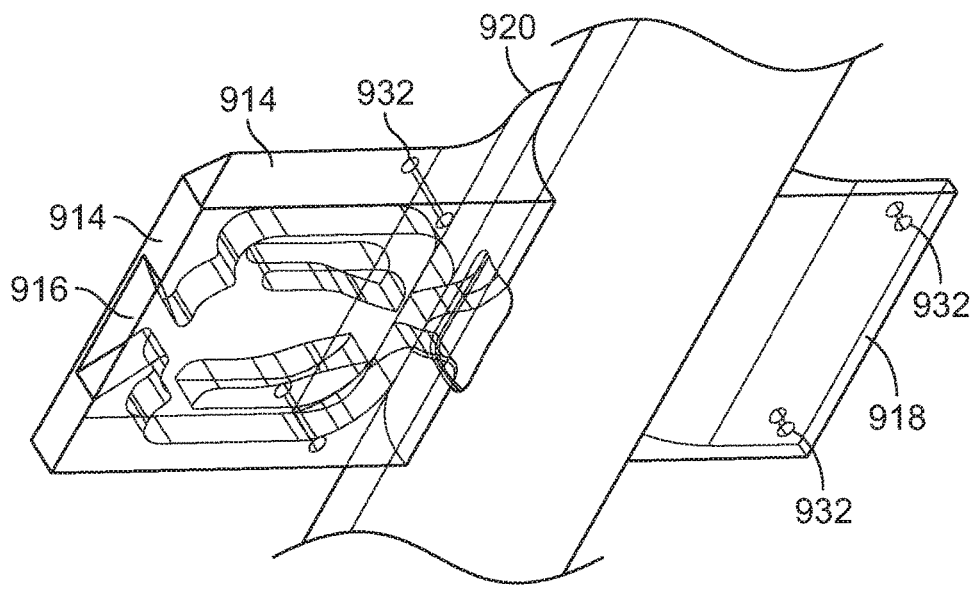

FIGS. 9A and 9B illustrate another example active flow control system 900 disclosed herein. The active flow control system 900 disclosed herein includes a segment 902 having a plenum 904 and a fluidic actuator 906. The plenum 904 of the illustrated example is substantially similar or identical to the plenum 804 of FIGS. 8A and 8B. Additionally, like the fluidic actuator 806 of FIGS. 8A and 8B, the fluidic actuator 906 of the illustrated example is a multi-piece fluidic actuator. However, the fluidic actuator 906 of the illustrated example couples to the plenum 904 via a compression fitting or connector 908. The connector 908 of the illustrated example is integrally formed with the fluidic actuator 906.

The fluidic actuator 906 of the illustrated example includes a first portion 910 (e.g., an upper half) and a second portion 912 (e.g., a base or lower half) removably coupled to the first portion 910. Specifically, the first portion 910 is a first unitary piece or structure and the second portion 912 is a second unitary piece or structure.

The first portion 910 of the illustrated example includes an actuator body 914 defining a fluidic flow path 916 of the fluidic actuator 906, a first mounting flange 918, and a first transition 920 connecting the actuator body 914 and the first mounting flange 918. Likewise, the second portion 912 of the illustrated example includes an actuator base 922, a second mounting flange 924 and a second transition 926 connecting the actuator base 922 and the second mounting flange 924. The first portion 910 matably couples to the second portion 912 when the fluidic actuator 906 is coupled to the plenum 904.

The first and second transitions 920, 926 form an opening 930 to receive the plenum 904 when the fluidic actuator 906 is coupled to the plenum 904. In the illustrated example, each of the first and second transitions 920, 926 of the illustrated example has an arcuate profile that is similar to (e.g., complementary with) an arcuate profile of an outer surface 928 of the plenum 904. For example, a radius of curvature of the outer surface 928 of the plenum 904 is substantially similar or identical to the radii of curvature of the respective first and second transitions 920, 926. To this end, the first and second transitions 920, 926 matably engage the outer surface 928 of the plenum 904. To couple the fluidic actuator 906 to the plenum 904, the first portion 910 (e.g., the first transition 920) is positioned on the plenum 904 such that the first portion 910 engages a first portion (e.g., an upper half) of the outer surface 928 of the plenum 904, and the second portion 912 (e.g., the second transition 926) is positioned on the plenum 904 such that the second transition 926 engages a second portion (e.g., a second half) of the outer surface 928 of the plenum 904. When the first portion 910 is coupled to the second portion 912, the actuator body 914 engages (e.g., directly engages) the actuator base 922, and the first mounting flange 918 engages (e.g., directly engages) the second mounting flange 924. The first and second mounting flanges 918, 924 and the actuator body 914 and the actuator base 922 include apertures 932 to receive fasteners (e.g., screws, rivets, etc.) to couple the first portion 910 and the second portion 912. Specifically, the first portion 910 presses against the second portion 912 when the first portion 910 is fastened to the second portion 912. For example, the first transition 920 and the second transition 926 press on the outer surface 928. The first and second portions 910 and 912 (e.g., the first and second transitions 920, 926) completely surround or encase the outer surface 928 of the plenum 904 when the fluidic actuator 906 is coupled to the plenum 904.

Figure 10:
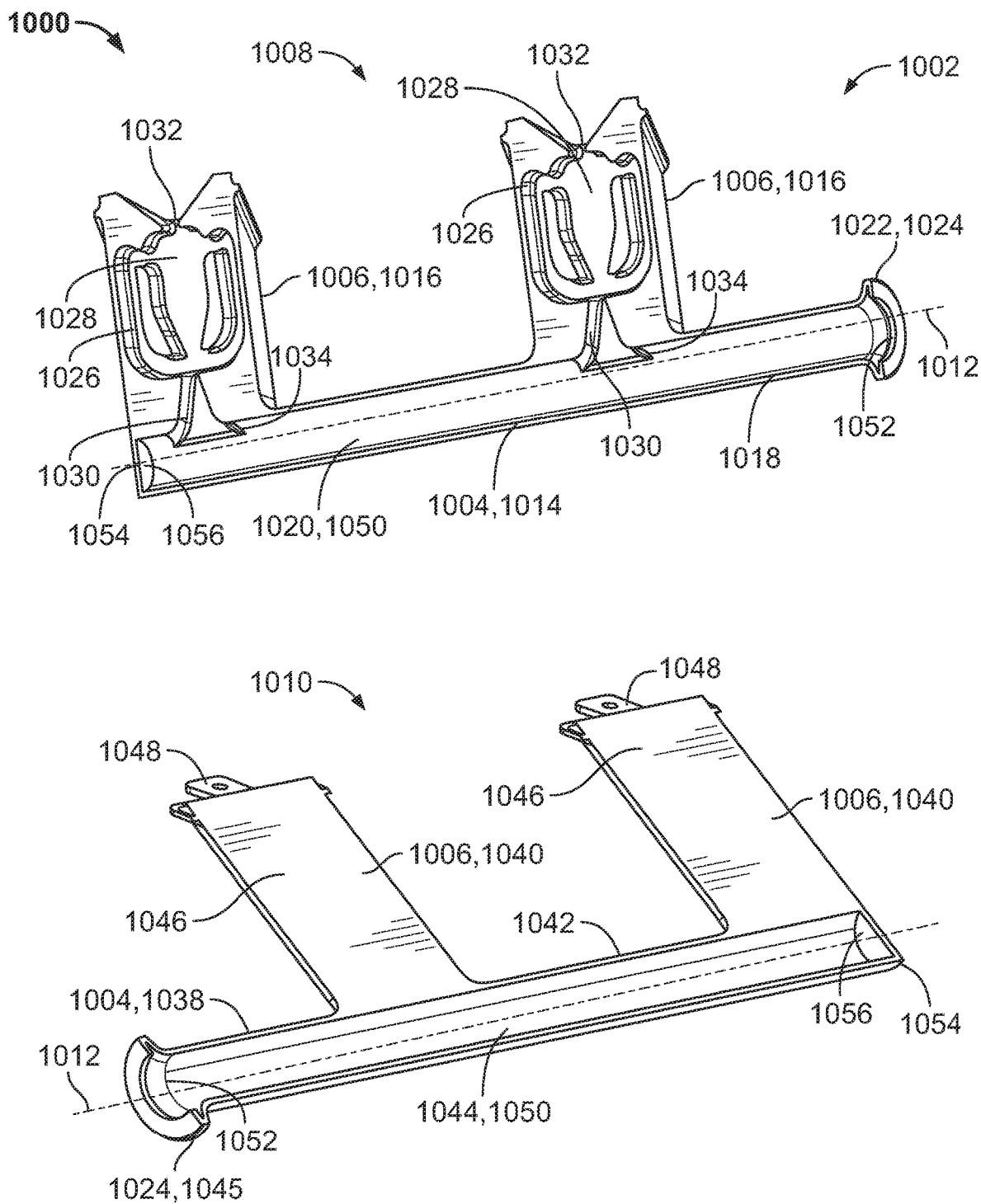
FIG. 10 illustrates an example first portion and an example second portion of another example active flow control system disclosed herein.

FIG. 10 illustrates another example active flow control system 1000 disclosed herein. The active flow control system 1000 disclosed herein includes a segment 1002 having a plenum 1004 and a plurality of fluidic actuators 1006. In the illustrated example, the segment 1002 includes a first segment portion 1008 and a second segment portion 1010. The first segment portion 1008 is formed as a single or unitary piece or structure, and the second segment portion 1010 is formed as a single or unitary piece or structure. In the illustrated example, the first segment portion 1008 and the second segment portion 1010 are taken along a longitudinal axis 1012 of the plenum 1004. The first segment portion 1008 is coupled to the second segment portion 1010 to form the segment 1002. For example, the first segment portion 1008 is coupled to the second segment portion 1010 via welding, adhesive, clamps and/or any other fastener(s).

The first segment portion 1008 defines a first plenum portion 1014 of the plenum 1004 (e.g., a first half of the plenum 1004) and a first actuator portion 1016 of the fluidic actuators 1006. The first plenum portion 1014 defines an arcuate body 1018 (e.g., a first half of a tube) forming a first cavity or first opening 1020 and a first portion 1022 of a flange 1024. The first actuator portions 1016 of the fluidic actuators 1006 of the illustrated example define actuator bodies 1026 that include fluidic flow paths 1028 between actuator inlets 1030 and actuator outlets 1032. The first plenum portion 1014 includes openings or slots 1034 to fluidly couple the first opening 1020 of the plenum 1004 and the actuator inlets 1030.

The second segment portion 1010 defines a second plenum portion 1038 of the plenum 1004 (e.g., a second half of the plenum 1004) and second actuator portions 1040 of the fluidic actuators 1006. The second plenum portion 1038 defines an arcuate body 1042 (e.g., a second half of a tube) forming a second cavity or second opening 1044 and a second portion 1045 of the flange 1024. The second actuator portions 1040 of the fluidic actuators 1006 of the illustrated example define actuator bases 1046 that seal or enclose the actuator bodies 1026 and/or the fluidic flow paths 1028 between the actuator inlets 1030 and the actuator outlets 1032. The actuator bases 1046 of the illustrated example include mounting tabs 1048. When the first plenum portion 1014 is coupled to the second plenum portion 1038, the first opening 1020 and the second opening 1044 provide a fluid flow path 1050 between a first end 1052 of the plenum 1004 (e.g., a plenum inlet) and the actuator inlets 1030. The flange 1024 can be used to couple the segment 1002 to another segment and/or a fluid supply source. A second end 1054 of the plenum 1004 of the illustrated example includes an end cap 1056. In some examples, the end cap 1056 can be removed and/or the second end 1054 can be formed with another flange (e.g., the flange 1024) to enable the plenum 1004 to couple to another segment or a valve (e.g., the second one-way valve 458 of FIG. 4A).

The first segment portion 1008 and the second segment portion 1010 can be formed via injection molding, machining, additive manufacturing and/or any combination thereof and/or any other suitable manufacturing process(es). The first segment portion 1008 and/or the second segment portion 1010 can be formed via metallic material(s), plastic material(s), alloy(s) and/or any combination thereof and/or any other suitable material(s).

Figure 11C:
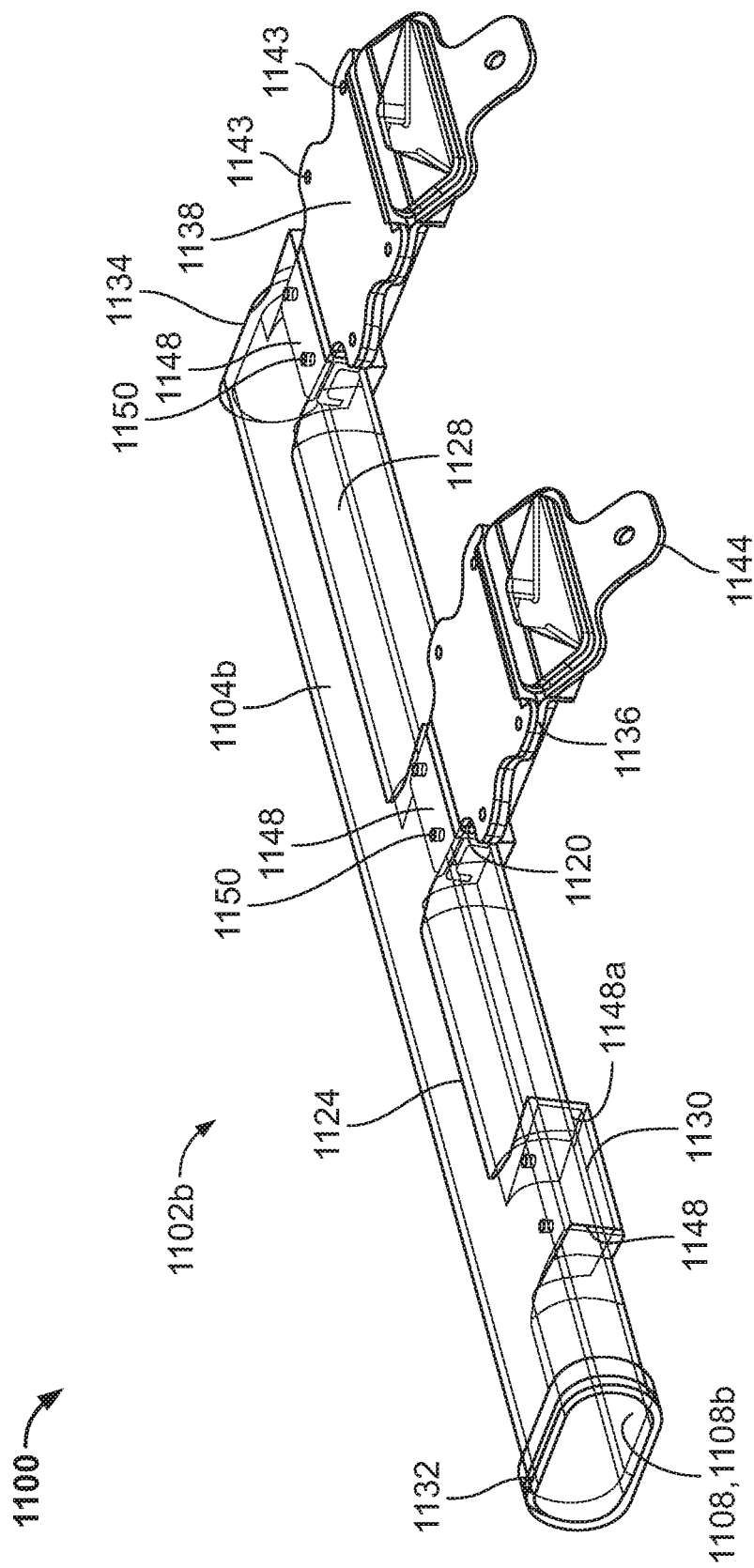

FIGS. 11A-11C illustrate another example active flow control system 1100 disclosed herein. FIG. 11A is perspective, partial view of a first segment 1102a of the active flow control system 1100. FIG. 11B is a partial, bottom view of the first segment 1102a of FIG. 10A. FIG. 11C is perspective, partial view of a second segment 1102b of the active flow control system 1100.

The first segment 1102a includes a first plenum 1104a and the second segment 1102b includes a second plenum 1104b that receive a plurality of fluidic actuators 1106. The first segment 1102a of the illustrated example is coupled to the second segment 1102b to provide a fluid flow path 1108 between a fluid supply source (e.g., the fluid supply source 452 of FIG. 4A) and the fluidic actuators 1106. For example, the first plenum 1104a can be coupled to the second plenum 1104b via a connector (e.g., the connector 506 of FIGS. 5A and 5B). To this end, a first end 1118 of the first plenum 1104a is coupled to a first end 1132 (e.g., a third end) of the second plenum 1104b. For example, the first end 1118 of the first plenum 1104a can abut or adjoin the first end 1132 of the second plenum 1104b. In some examples, the first end 1118 of the first plenum 1104a couples to the first end 1132 of the second plenum 1104b via a coupler or connector (e.g., a v-band clamp connector, a flexible coupling, an elbow, etc.). In some examples, the first end 1118 of the first plenum 1104a couples to the first end 1132 of the second plenum 1104b via a chemical fastener (e.g., adhesive, etc.). Each of the first plenum 1104a and the second plenum 1104b of the illustrated example has an elliptical cross-sectional shape. In some examples, the first plenum 1104a and/or the second plenum 1104b can have non-circular cross-sectional shapes, rectangular cross-shapes, oblong shapes, and/or any other shape(s). Thus, the fluid flow path 1108 has a generally non-circular cross-sectional shape (e.g., rectangular with rounded edges or an oblong shape). Any number of plenums can be coupled together to form the active flow control system 1100. In some examples, a third plenum (e.g., a plenum identical to the first plenum 1104a and/or the second plenum 1104b) can be coupled to the first plenum 1104a and/or the second plenum 1104b. The first plenum 1104a and the second plenum 1104b define the fluid flow path to provide pressurized fluid from a supply source to the first and second fluidic actuators.

The first plenum 1104a of the illustrated example defines a first body 1110 having a first passageway 1108a and a first outer surface 1112. The first outer surface 1112 includes a plurality of openings or slots 1114 positioned between the first end 1118 and a second end 1116 of the first plenum 1104a to receive the fluidic actuators 1106. The fluidic actuators 1106 are attached to and spaced along the first outer surface 1112. In the illustrated example, respective ones of actuator inlets 1120 are in fluid communication with respective ones of the slots 1114 (e.g., illustrated with a portion of the fluidic actuator 1106 hidden at this location in FIG. 11A) to fluidly couple the fluidic actuators 1106 and the first passageway 1108a of the first body 1110 to enable fluid flow between the first passageway 1108a and actuator outlets 1122 via the actuator inlets 1120.

Likewise, the second plenum 1104b of the illustrated example defines a second body 1124 having a second passageway 1108b and a second outer surface 1128. The second outer surface 1128 includes a plurality of openings or slots 1130 (e.g., illustrated with a portion of the fluidic actuator 1106 hidden at this location in FIG. 11A) positioned between the first end 1132 (e.g., a third end) and a second end 1134 (e.g., a fourth end) of the second plenum 1104b to receive the fluidic actuators 1106. The fluidic actuators 1106 are attached to and spaced along the second outer surface 1128. In the illustrated example, respective ones of the actuator inlets 1120 are in fluid communication with respective ones of the slots 1130 to fluidly couple the fluidic actuators 1106 and the second passageway 1108b to enable fluid flow between the second passageway 1108b and the actuator outlets 1122 via the actuator inlets 1120. In some examples, the first plenum 1104a and/or the second plenum 1104b can include only one fluidic actuator 1106. In some examples, the first plenum 1104a and/or the second plenum 1104b can be configured without any fluidic actuators 1106. Such example plenums can be employed to define the fluid flow path without providing flow control.

The fluidic actuators 1106 of the illustrated example are formed as multi-piece structures. Each of the fluidic actuators 1106 of the illustrated example includes an actuator body 1136 and a base 1138 coupled to the actuator body 1136. The actuator body 1136 defines a fluidic channel between the actuator inlet 1120 and the actuator outlet 1122. The base 1138 of the illustrated example includes a mounting tab 1144 to couple to the fluidic actuators 1106 to a structure of a vehicle (e.g., the aircraft 100). The actuator body 1136 is coupled to the base 1138 via fasteners (e.g., screws). To receive the fasteners, the actuator body 1136 and the base 1138 of the illustrated example includes flanges 1142 that couple together to align openings 1143 that receive fasteners. In this manner, the actuator body 1136 can be manufactured separately from the base 1138. In other examples, the base 1138 can be coupled to the actuator body 1136 via adhesive, welding, etc. The actuator inlets 1120 can have complex geometrical shape(s). For example, the actuator inlets 1120 can have non-circular cross-sectional shapes including, for example, rectangular, oblong, square, and/or any other non-circular cross-sectional shapes. In some examples, the actuator inlets 1120 can have a circular cross-sectional shape.

To attach the fluidic actuators 1106 to the first and second plenums 1104a, 1104b, the outer surfaces 1112, 1128 include a plurality of flanges 1148 protruding therefrom. Specifically, respective ones of the flanges 1148 are associated with respective ones of the slots 1114, 1130. The flanges 1148 and the slots 1114, 1130 of the illustrated example have rectangular cross-sectional shapes. However, in other examples, the flanges 1148 can have circular cross-sectional shape, square cross-sectional shape, oblong cross-sectional shape and/or any other cross-sectional shape. The flanges 1148 of the illustrated example are integrally formed with the respective first and second plenums 1104a, 1104b. The flanges 1148 of the illustrated example define openings 1148a to receive the actuator inlets 1120 of the fluidic actuators 1106. Thus, at least a portion of the fluidic actuators 1106 are received by (e.g., positioned in) respective ones of the flanges 1148. For example, a respective one of the slots 1114 receives a respective one of the actuator inlets 1120. For example, at least a portion (e.g., an end) of respective ones of the fluidic actuators 1106 (e.g., a body or end of the fluidic actuator 1106) is inserted into respective ones of the slots of the plenums and/or the openings 1148a formed by the flanges 1148. The fluidic actuators 1106 of the illustrated example are attached to the flanges 1148 via fasteners 1150 (e.g., screws, rivets, etc.). The fluidic actuators 1106 include apertures that align with apertures of the flanges 1148 to receive the fasteners 1150. When coupled to the first and second plenums 1104a, 1104b, each of the fluidic actuators 1106 has a longitudinal axis 1152 that is non-parallel (e.g., substantially perpendicular) relative to a longitudinal axis 1154 of the fluid flow path 1108.

Figure 12:
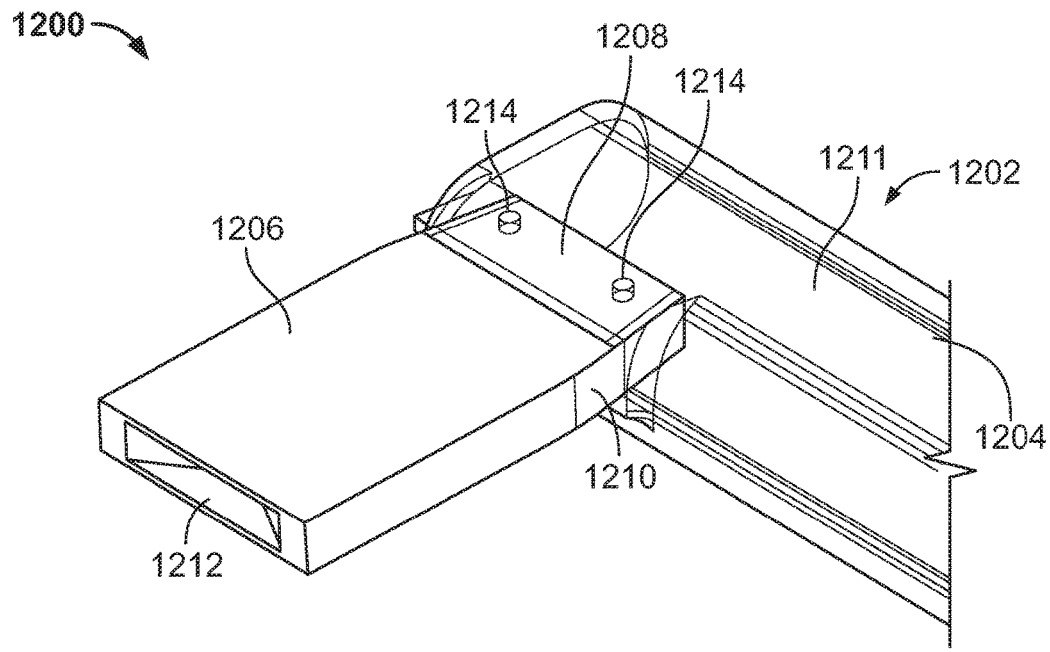
FIGS. 12-13 illustrate yet other example active flow control systems disclosed herein.

FIG. 12 illustrate another example active flow control system 1200 disclosed herein. The active flow control system 1200 of the illustrated example includes a segment 1202 including a plenum 1204 and a fluidic actuator 1206 coupled to the plenum 1204. The fluidic actuator 1206 of the illustrated example is coupled to a flange 1208 that is formed with an outer surface 1211 of the plenum 1204. The fluidic actuator 1206 of the illustrated example includes a tapered end 1210 adjacent an actuator inlet opposite an actuator outlet 1212 of the fluidic actuator 1206. The tapered end 1210 enables the fluidic actuator 1206 to couple to the flange 1208 via an interference or friction fit. In the illustrated example, fasteners 1214 retain the fluidic actuator 1206 to the flange 1208 of the plenum 1204.

Figure 13:
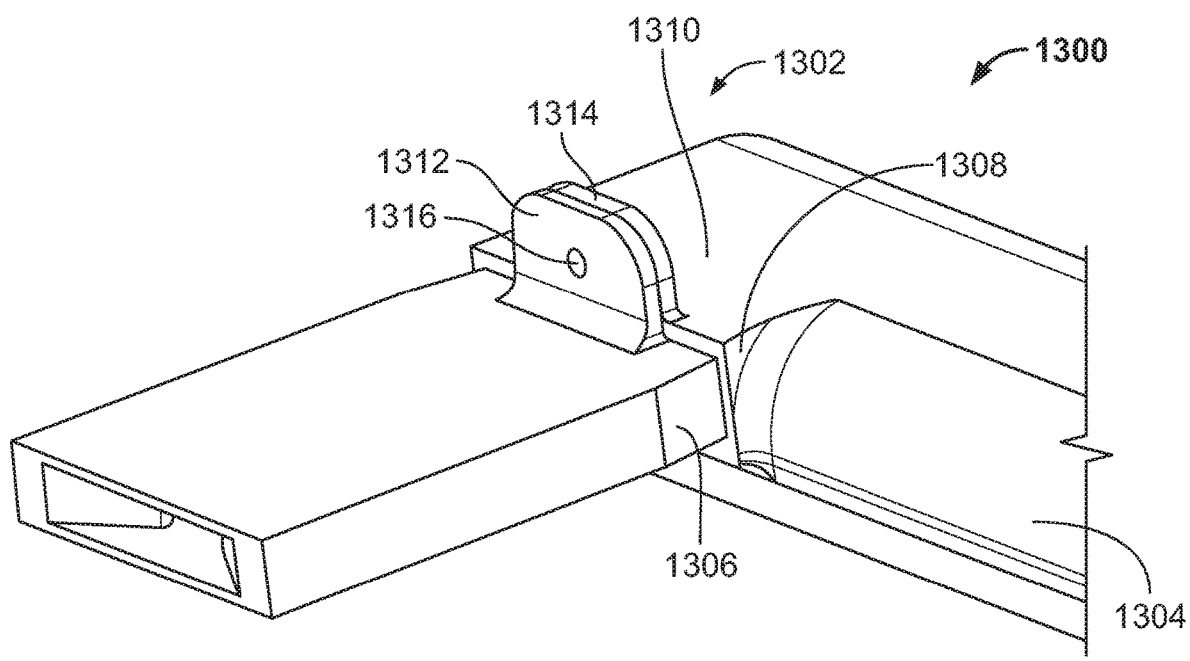

FIG. 13 illustrates another example active flow control system 1300 disclosed herein. The active flow control system 1300 of the illustrated example is substantially similar to the active fluid control system of FIG. 1200. For example, the active flow control system 1300 includes a segment 1302 having a plenum 1304 and a fluidic actuator 1306 coupled to the plenum 1304. The plenum 1304 of the illustrated example includes a flange 1308 protruding from an outer surface 1310 of the plenum that receives the fluidic actuator 1306 via friction fit. The fluidic actuator 1306 includes a mounting tab 1312 protruding from the fluidic actuator 1306 and the flange 1308 includes a mounting tab 1314 protruding from the outer surface 1310 of the plenum 1304 adjacent the flange 1308. The mounting tab 1314 of the flange 1308 is to matably engage the mounting tab 1312 of the fluidic actuator 1306. The mounting tabs 1312, 1314 provide an opening 1316 to receive a fastener (e.g., a screw, a bolt and nut, a rivet, etc.) to retain the fluidic actuator 1306 and the flange 1308 of the plenum 1304.

Figure 14A:
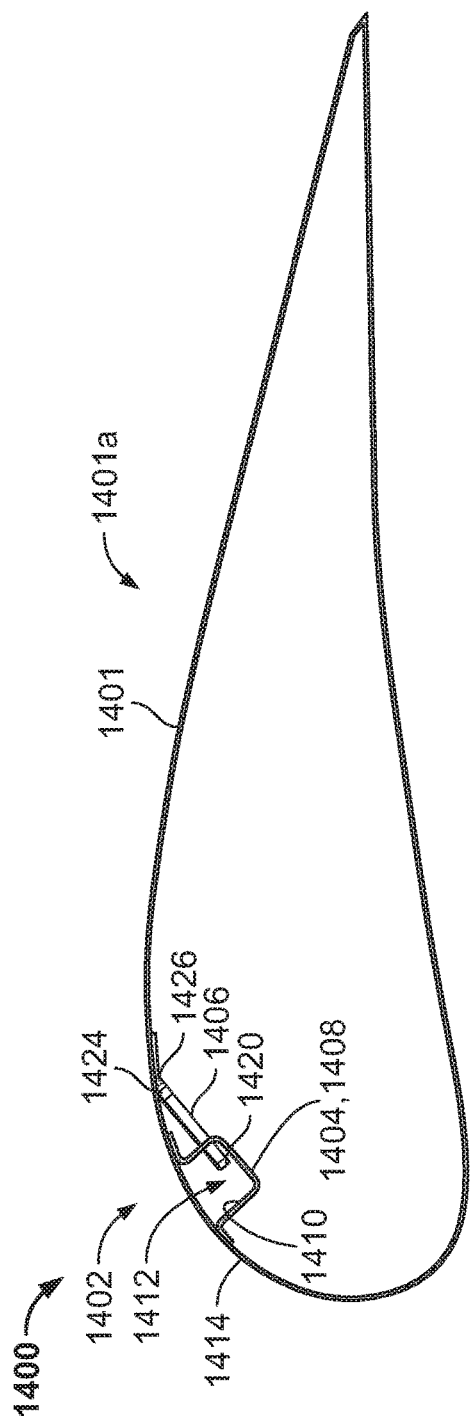
FIG. 14A is a cross-sectional view of another example aerodynamic surface implemented with another example active flow control system disclosed herein.
Figure 14B:
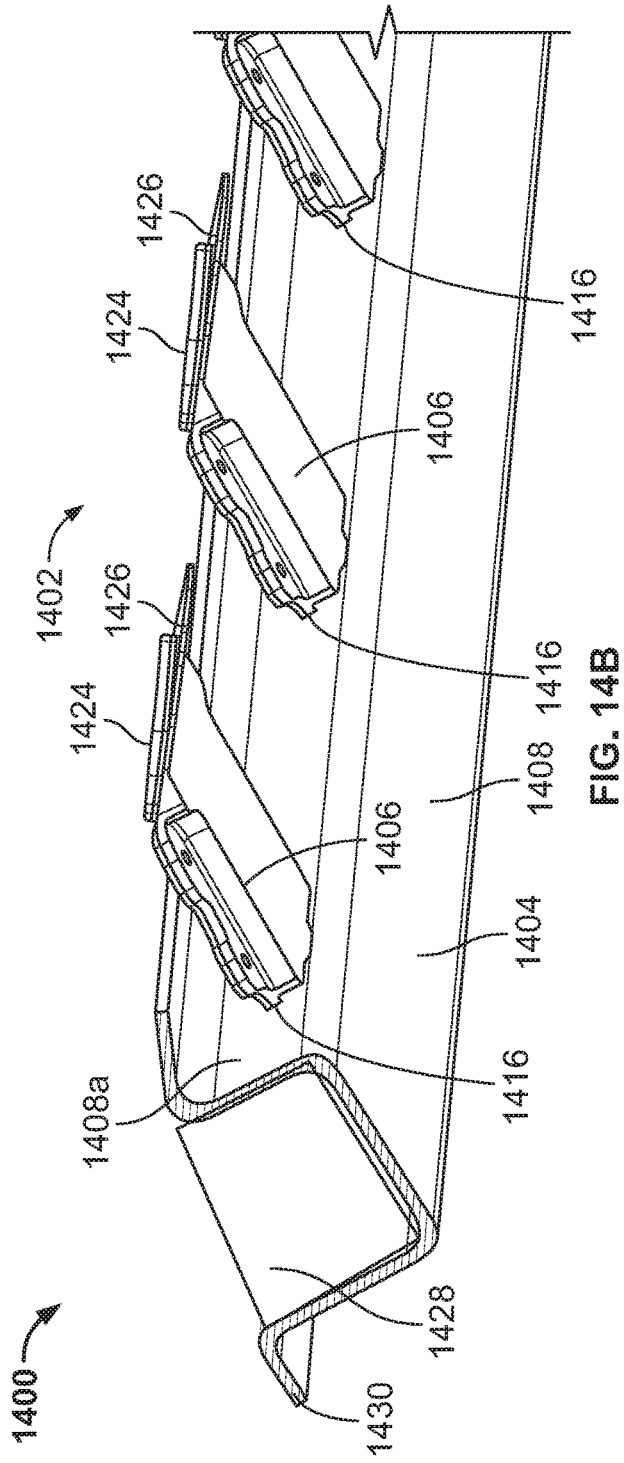
FIG. 14B is a perspective, partial view of the example active flow control system of FIG. 14A.

FIGS. 14A-14B illustrate another example active flow control system 1400 disclosed herein. FIG. 14A is a cross-sectional view of an aerodynamic surface 1401 of a vehicle 1401a (e.g., an aircraft wing) implemented with the active flow control system 1400. FIG. 14B is a perspective, partial view of the active flow control system 1400 of FIG. 14A.

Referring to FIGS. 14A and 14B, the active flow control system 1400 of the illustrated example includes a segment 1402 including a plenum 1404 and fluidic actuators 1406 coupled to the plenum 1404. The plenum 1404 of the illustrated example is formed from a stringer 1408 of the vehicle 1401a (e.g., the aircraft 100). Specifically, the stringer 1408 includes a channel 1410 that defines a fluid flow path 1412 to fluidly couple fluid from a supply source and the fluidic actuators 1406. A skin 1414 of the vehicle 1401a attaches to the stringer 1408 to enclose or cover (e.g., an upper end or upper opening of) the channel 1410 defining the fluid flow path 1412. In some examples, a cover can be coupled to the stringer 1408 to enclose the channel 1410. The stringer 1408 of the illustrated example includes a plurality of openings 1416 to receive the fluidic actuators 1406. For example, the fluidic actuators 1406 of the illustrated example are bonded to a side surface 1408a of the stringer 1408. When coupled to the stringer 1408, the fluidic actuators 1406 of the illustrated example protrude from a side surface 1408a of the stringer 1408. The fluidic actuators 1406 include actuator inlets 1420 in fluid communication with the channel 1410 and, thus, the fluid flow path 1412 defined by the stringer 1408. In the illustrated example, a portion of the fluidic actuators 1406 defining the actuator inlets 1420 protrude or are interposed in the channel 1410 of the stringer 1408.

During operation, a fluid supply source provides fluid (e.g., pressurized fluid or air) to the fluidic actuators 1406 via the channel 1410. The fluidic actuators 1406 expel or inject pressurized fluid into a boundary layer of the aerodynamic surface 1401 of the vehicle 1401a via actuator outlets 1424 of the fluidic actuators 1406. The actuator outlets 1424 are flush mounted to the skin 1414 via mounting tabs 1426. In some examples, a cap 1428 can be employed to block fluid flow past an end 1430 of the stringer 1408.

Figure 15:
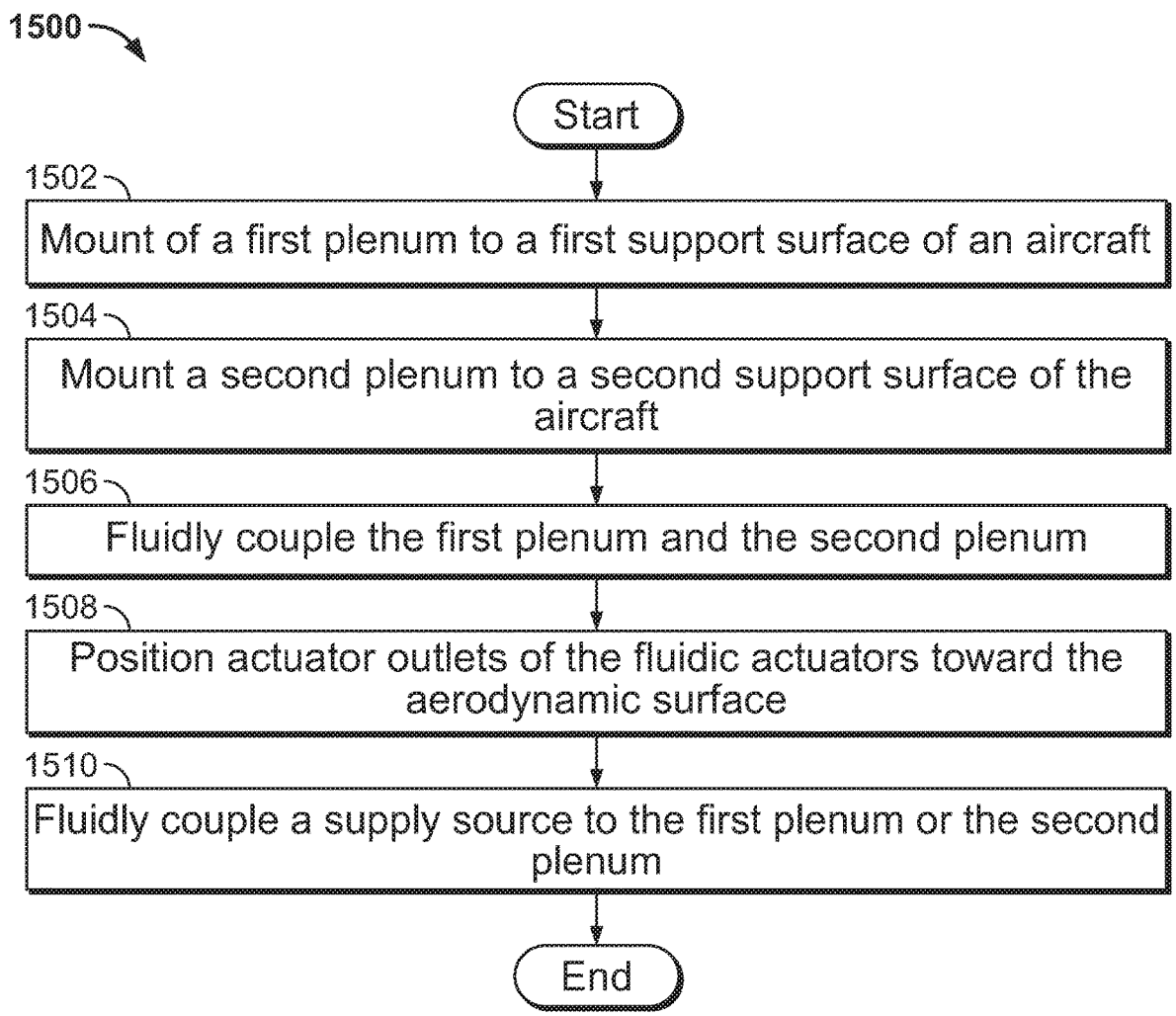
FIG. 15 is a flowchart of an example method of installing an example active flow control system disclosed herein to an aircraft.

FIG. 15 is a flowchart of an example method 1500 of installing an active flow control system disclosed herein. In some examples, the flowchart represents a method 1500 to retrofit an aircraft with an example active flow control system disclosed herein. While the example method 1500 is disclosed in FIG. 15, one or more of the blocks and/or processes illustrated in FIG. 15 can be combined, divided, re-arranged, omitted, eliminated and/or implemented in any other way. Further still, the example method of FIG. 15 can include one or more processes and/or blocks in addition to, or instead of, those illustrated in FIG. 15, and/or can include more than one of any or all of the illustrated processes and/or blocks. Although the example method 1500 is described with reference to the flowchart illustrated in FIG. 15, many other methods of installing the active flow control systems can alternatively be used. For simplicity, the method 1500 of FIG. 15 is described in connection with the active flow control system 200 of FIGS. 2A, 2B, 3A and 3B. However, the method 1500 of FIG. 15 can be used to implement all other active control systems disclosed herein.

The method begins when a first plenum 204a is mounted to a first support structure 226a of an aircraft 100 (block 1502). For example, the first plenum 204a is coupled to a stringer, a rib, a frame, and/or any other structure that supports the skin 230 of the aircraft 100. In some examples, the first plenums 204a at least passes through or bypasses the first support structure 226a of the aircraft 100. To pass through the first support structure 226a, an opening 227 is formed through the first support structure 226a that is sized larger than an outer surface of the first plenum 204a. In some examples, the fluidic actuators 210 of the first plenum 204a are pre-installed or pre-formed with the first plenum 204a prior to mounting the first plenum 204a to the first support structure 226a. In some examples, the fluidic actuators 210 are coupled to the first plenum 204a after the first plenum 204a is coupled to the first support structure 226a.

A second plenum 204b is mounted to a second support structure 226b of the aircraft 100 (block 1504). For example, the second plenum 204b is coupled to a stringer, a rib, a frame, and/or any other structure that supports the skin 230 of the aircraft 100. In some examples, the second plenum 204b at least partially passes through or bypasses the second support structure 226b of the aircraft 100. To pass through the second support structure 226b, an opening is formed through the second support structure 226b that is sized larger than an outer surface of the second plenum 204b. In some examples, the fluidic actuators 210 are pre-installed or preformed with the second plenum 204b prior to coupling the second plenum 204b to the second support structure 226b. In some examples, the fluidic actuators 210 are coupled to the second plenum 204b after the second plenum 204b is coupled to the second support structure 226b.

Next, the first plenum 204a is fluidly coupled to the second plenum 204b via a connector 216 so that a passageway 208 of the first plenum 204a is in fluid communication with a passageway 208 of the second plenum 204b (block 1506). For example, respective ends of the first and second plenums 204a, 204b can be coupled or joined via a clamp and/or a fastener. In some examples, a seal (e.g., an O-ring, a sealant, adhesive, etc.) can be provided between the respective ends of the first and second plenums 204a, 204b to seal an interface or connection between the first and second plenums 204a, 204b.

Additionally, the actuator outlets 214 of the fluidic actuators 210 are positioned toward the aerodynamic surface 203 (block 1508). A fluid supply source 206 is fluidly coupled to one of the first plenum 204a or the second plenum 204b

(block 1510). The fluid supply source 206 provides pressurized fluid (e.g., pressurized air, pressurized liquid, etc.) to the fluidic actuators 210 of the first and second plenums 204a, 204b, via the first plenum 204a and the second plenum 204b.

The following paragraphs provide various examples of the active flow control systems disclosed herein. Additionally, several examples have been described throughout this specification. Any features from any example can be included with, a replacement for, or otherwise combined with other features from other examples. For example, the foregoing examples of the active flow control systems can be employed with an aircraft and/or aircraft engine. Although each of example active flow control systems disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. In some examples, active flow control system disclosed in accordance with the teachings of this disclosure can have a combination of the plenums and/or fluidic actuators disclosed herein.

Example 1 includes an active flow control system having a plurality of plenums coupled together to define a fluid flow passageway, and a plurality of fluidic actuators coupled to outer surfaces of respective ones of the plenums. The fluidic actuators define actuator inlets and actuator outlets. The fluid flow passageway defined by the plenums to fluidly couple the fluidic actuators and a pressurized fluid supply source. The plenums are configured to couple to an aircraft structure supporting an aerodynamic surface to enable the actuator outlets to be mounted to the aerodynamic surface. The fluidic actuators are configured to provide the pressurized fluid to the aerodynamic surface to modify an aerodynamic characteristic of the aerodynamic surface.

Example 2 includes the system of Example 1, further including connectors to couple the plenums to define the fluid flow passageway.

Example 3 includes the system of any one of Examples 1-2, where the connectors include at least one of a v-band clamp connector, a coupling, or a male-to-female connector.

Example 4 includes the system of any one of Examples 1-3, where the fluidic actuators are fluidic oscillators.

Example 5 includes the system of any one of Examples 1-4, where each of the actuator inlets has a rectangular shaped cross-section.

Example 6 includes the system of any one of Examples 1-5, where each of the fluidic actuators has an actuator body and an actuator base, the actuator body being coupled to the actuator base.

Example 7 includes the system of any one of Examples 1-6, where the fluidic actuators are coupled to the outer surfaces of the respective ones of the plenums via at least one of welding, mechanical fasteners, chemical fasteners, and interference fit.

Example 8 includes the system of any one of Examples 1-7, where the fluidic actuators and the respective ones of the plenums are formed as a unitary piece or structure.

Example 9 includes the system of any one of Examples 1-8, where each of the outer surfaces of the plenums includes a plurality of slots spaced along a longitudinal axis of the fluid flow passageway, respective ones of the slots to receive respective ones of the fluidic actuators, the respective ones of the slots to fluidly couple the fluid flow path to the respective ones of the actuator inlets.

Example 10 includes the system of any one of Examples 1-9, where each of the outer surfaces of the plenums include a plurality of flanges protruding therefrom, respective ones of the flanges being associated with respective ones of the slots, the respective ones of the flanges to receive the respective ones of the fluidic actuators.

Example 11 includes an active flow control system including a first plenum to be supported by a first frame adjacent an aerodynamic surface of a vehicle. The first plenum includes a first body defining a first passageway between a first end and a second end. The first body having a first outer surface including a first opening. A first fluidic oscillator is attached to the first outer surface. The first fluidic oscillator includes a first actuator inlet and a first actuator outlet. The first actuator inlet is in fluid communication with the first opening, the first opening to fluidly couple the first fluidic oscillator and the first passageway to enable fluid flow between the first passageway and the first actuator outlet via the first actuator inlet. A second plenum includes a second body defining a second passageway between a third end and a fourth end. A connector is configured to couple the first plenum and the second plenum such that the first passageway and the second passageway are in fluid communication and define a fluid flow pathway of the active flow control system.

Example 12 includes the system of Example 11, where wherein the first end of the first plenum is directly attached to the third end of the second plenum.

Example 13 includes the system of any one of Examples 11-12, where the connector includes a v-band clamp.

Example 14 includes the system of any one of Examples 11-13, where at least one of the second end of the first plenum or the fourth end of the second plenum is configured to fluidly couple to a fluid supply source, the fluid supply source configured to provide a pressurized fluid to the first fluidic oscillator via the fluid flow pathway defined by the first and second plenums.

Example 15 includes the system of any one of Examples 11-14, further including a first one-way valve fluidly coupled to at least one of the first end of the first plenum or the fourth end of the second plenum, the first one-way valve configured to allow pressurized fluid to flow to the first and second plenums and to prevent back flow of fluid to a fluid supply source, the first one-way valve being coupled between the fluid supply source and the at least one of the first end of the first plenum or the fourth end of the second plenum.

Example 16 includes the system of any one of Examples 11-15, further including a second one-way valve fluidly coupled to the active flow control system at a point of lowest elevation, the second one-way valve configured to prevent the pressurized fluid from exiting the first and second plenums when the fluid supply source provides the pressurized fluid to the active flow control system and to allow fluid to drain when the fluid supply source does not provide the pressurized fluid to the active flow control system.

Example 17 includes the system of any one of Examples 11-16, where wherein the second plenum includes: a second outer surface including a second opening; and a second fluidic oscillator attached to the second outer surface, the second fluidic oscillator including a second actuator inlet and a second actuator outlet, the second actuator inlet being in fluid communication with the second opening, the second opening to fluidly couple the second fluidic oscillator and the second passageway to enable fluid flow between the second passageway and the second actuator outlet via the second actuator inlet.

Example 18 includes the system of any one of Examples 11-17, where the second plenum is to be supported by a second frame adjacent the aerodynamic surface of the vehicle.

Example 19 includes a method, which includes mounting a first plenum having at least one first fluidic actuator to a first aircraft structure adjacent an aerodynamic surface of the aircraft, a first passageway of the first plenum being in fluid communication with first fluidic inlets of the at least one first fluidic actuator; mounting a second plenum having at least one second fluidic actuator to a second aircraft structure adjacent the aerodynamic surface of the aircraft, a second passageway of the second plenum being in fluid communication with second fluidic inlets of the at least one second fluidic actuator, wherein at least a portion of the first plenum or the second plenum is configured to bypass at least one of the first aircraft structure and the second aircraft structure; fluidly coupling the first plenum and the second plenum via a connector so that the first passageway is in fluid communication with the second passageway; positioning fluid outlets of the at least one first and second fluidic actuators toward the aerodynamic surface; and fluidly coupling a supply source to at least one of the first plenum and the second plenum, the supply source configured to provide pressurized fluid to the at least one first fluidic actuator and the at least one second fluidic actuator via the first and second plenums.

Example 20 includes the method of Example 19, further including forming an opening through the aircraft structure to receive the at least the portion of the first plenum or the second plenum.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An active flow control system for an aircraft, the system comprising:
    a plurality of plenums coupled together to define a fluid flow passageway;
    a plurality of fluidic actuators directly mounted to outer surfaces of respective ones of the plenums, the fluidic actuators defining actuator inlets and actuator outlets, each of the outer surfaces of the plenums includes a plurality of slots spaced along a longitudinal axis of the fluid flow passageway, respective ones of the slots to receive respective ones of the fluidic actuators such that the respective ones of the slots are coplanar with respective ones of the actuator inlets, the fluid flow passageway defined by the plenums to fluidly couple the fluidic actuators and a pressurized fluid supply source, the plenums configured to couple to an aircraft structure supporting an aerodynamic surface to enable the actuator outlets to be mounted to the aerodynamic surface, the fluidic actuators configured to provide the pressurized fluid to the aerodynamic surface to modify an aerodynamic characteristic of the aerodynamic surface;
    a first one-way valve coupled to a first end of the fluid passageway; and
    a second one-way valve coupled to a second end of the fluid passageway opposite the first end, the plenums positioned between the first valve and the second valve, the second end of the fluid passageway defining a lowest point of elevation of the fluid passageway.

2. The system as defined in claim 1, further including connectors to couple the plenums to define the fluid flow passageway.

3. The system as defined in claim 2, wherein the connectors include at least one of a v-band clamp, a coupling, and a male-to-female connector.

4. The system as defined in claim 1, wherein the fluidic actuators are fluidic oscillators.

5. The system as defined in claim 1, wherein each of the actuator inlets has a rectangular shaped cross-section.

6. The system as defined in claim 1, wherein each of the fluidic actuators has an actuator body and an actuator base, the actuator body being coupled to the actuator base.

7. The system as defined in claim 1, wherein the fluidic actuators are coupled to the outer surfaces of the respective ones of the plenums via at least one of welding, mechanical fasteners, chemical fasteners, and an interference fit.

8. The system as defined in claim 1, wherein the fluidic actuators and respective ones of the plenums are formed as a unitary piece.

9. The system as defined in claim 1, wherein each of the outer surfaces of the plenums includes a plurality of flanges protruding therefrom, respective ones of the flanges being associated with respective ones of the slots, the respective ones of the flanges to receive the respective ones of the fluidic actuators.

10. An active flow control system comprising:
    a first plenum to be supported by a first frame adjacent an aerodynamic surface of a vehicle; the first plenum including:
        a first body defining a first passageway between a first end and a second end, the first body having an oblong cross-sectional shape such that an upper surface of the first body and a lower surface of the first body opposite the upper surface have substantially flat surfaces, the first body having a first outer surface including a first flange protruding from the outer surface to define a first opening; and
        a first fluidic oscillator directly attached to the first outer surface via the first flange, the first fluidic oscillator including:
            a second body including a second flange, the second body defining a first actuator inlet and a first actuator outlet, the first actuator inlet being coplanar with the first opening, the first opening to fluidly couple the first fluidic oscillator and the first passageway to enable fluid flow between the first passageway and the first actuator outlet via the first actuator inlet, the first actuator outlet defining an exit path of the fluid flow to the aerodynamic surface of the vehicle; and
            a base separate from the second body, the base including a third flange and a mounting tab, the third flange to couple to the second flange, the mounting tab to couple the first fluidic oscillator to the aerodynamic surface of the vehicle;
    a second plenum including a second body defining a second passageway between a third end and a fourth end, the second body having an oblong cross-sectional shape such that an upper surface of the second body and a lower surface of the second body opposite the upper surface have substantially flat surfaces; and
    a connector configured to couple the first plenum and the second plenum such that the first passageway and the second passageway are in fluid communication and define a fluid flow pathway of the active flow control system.

11. The system as defined in claim 10, wherein the first end of the first plenum is directly attached to the third end of the second plenum.

12. The system as defined in claim 11, wherein the connector includes a v-band clamp.

13. The system as defined in claim 10, wherein at least one of the second end of the first plenum or the fourth end of the second plenum is configured to fluidly couple to a fluid supply source, the fluid supply source configured to provide a pressurized fluid to the first fluidic oscillator via the fluid flow pathway defined by the first and second plenums.

14. The system as defined in claim 10, further including a first one-way valve fluidly coupled to at least one of the first end of the first plenum or the fourth end of the second plenum, the first one-way valve configured to allow pressurized fluid to flow to the first and second plenums and to prevent back flow of fluid to a fluid supply source, the first one-way valve being coupled between the fluid supply source and the at least one of the first end of the first plenum or the fourth end of the second plenum.

15. The system as defined in claim 14, further including a second one-way valve fluidly coupled to the active flow control system at a point of lowest elevation, the second one-way valve configured to prevent pressurized fluid from exiting the first and second plenums when the fluid supply source provides the pressurized fluid to the active flow control system and to allow fluid to drain when the fluid supply source does not provide the pressurized fluid to the active flow control system.

16. The system as defined in claim 10, wherein the second plenum includes:
a second outer surface including a fourth flange defining a second opening; and
a second fluidic oscillator directly attached to the second outer surface via the fourth flange, the second fluidic oscillator including a second actuator inlet and a second actuator outlet, the second actuator inlet being coplanar with the second opening, the second opening to fluidly couple the second fluidic oscillator and the second passageway to enable fluid flow between the second passageway and the second actuator outlet via the second actuator inlet.

17. The system as defined in claim 10, wherein the second plenum is to be supported by a second frame adjacent the aerodynamic surface of the vehicle.

18. A method of mounting a fluid delivery system to an aircraft, the method comprising:
directly mounting a first fluidic actuator to an outer surface of a first plenum via a first flange protruding from the outer surface of the first plenum such that a first fluidic inlet of the first fluidic actuator is at least partially inserted in the first plenum, the first plenum defining a first passageway in fluid communication with the first fluidic inlet;
mounting the first plenum to a first aircraft structure adjacent an aerodynamic surface of the aircraft;
directly mounting a second fluidic actuator to an outer surface of a second plenum via a second flange protruding from the outer surface of the second plenum such that a second fluidic inlet of the second fluidic actuator is at least partially inserted in the second plenum, the second plenum defining a second passageway in fluid communication with second fluidic inlet;
mounting the second plenum to a second aircraft structure adjacent the aerodynamic surface of the aircraft, wherein at least a portion of the first plenum or the second plenum is configured to bypass at least one of the first aircraft structure or the second aircraft structure;
fluidly coupling the first plenum and the second plenum via a connector so that the first passageway is in fluid communication with the second passageway;
positioning fluid outlets of at least one of the first or second fluidic actuators toward the aerodynamic surface;
fluidly coupling a supply source to the first plenum, the supply source configured to provide pressurized fluid to at least one of the first fluidic actuator or the second fluidic actuator via the first and second plenums;
coupling a first one-way valve to a first end of the first plenum; and
coupling a second one-way valve to a second end of the second plenum, the first plenum and the second plenum positioned between the first valve and the second valve, the second end of the second plenum at a lower point of elevation than the first end of the first plenum.

19. The method as defined in claim 18, further including forming an opening through the aircraft structure to receive the at least the portion of the first plenum or the second plenum.

20. The active flow control system of claim 1, wherein the fluidic actuators include first portions and second portions coupled to the first portions, the first portions to engage first halves of the respective outer surfaces of the plenums, the second portions to engage second halves of the respective outer surfaces of the plenums to encase the outer surfaces of the respective ones of the plenums.

* * * * *